(12) United States Patent
Lum et al.

(10) Patent No.: US 12,111,797 B1
(45) Date of Patent: Oct. 8, 2024

(54) SCHEMA INFERENCE SYSTEM

(71) Applicant: Storytellers.ai LLC, Issaquah, WA (US)

(72) Inventors: Kirsten Rae Lum, Issaquah, WA (US); Wing Yew Lum, Issaquah, WA (US); Christopher John Gutierrez, Taos, NM (US)

(73) Assignee: Storytellers.ai LLC, Issaquah, WA (US)

( * ) Notice: Subject to any disclaimer, the term of this patent is extended or adjusted under 35 U.S.C. 154(b) by 0 days.

(21) Appl. No.: 18/371,931

(22) Filed: Sep. 22, 2023

(51) Int. Cl.
| | | |
|---|---|---|
| *G06F 15/16* | (2006.01) |
| *G06F 16/21* | (2019.01) |
| *G06F 16/22* | (2019.01) |
| *G06F 16/2453* | (2019.01) |
| *G06F 16/2455* | (2019.01) |

(52) U.S. Cl.
CPC .......... *G06F 16/211* (2019.01); *G06F 16/221* (2019.01); *G06F 16/24544* (2019.01); *G06F 16/2456* (2019.01)

(58) Field of Classification Search
None
See application file for complete search history.

(56) References Cited

U.S. PATENT DOCUMENTS

| | | | |
|---|---|---|---|
| 9,454,576 B1 * | 9/2016 | Kapoor | G06F 16/24564 |
| 10,885,160 B1 | 1/2021 | Guo | |
| 11,544,796 B1 | 1/2023 | Mohamed et al. | |
| 11,580,127 B1 * | 2/2023 | Newman | G06F 16/9024 |
| 11,693,637 B1 | 7/2023 | Singh et al. | |
| 11,734,937 B1 | 8/2023 | Pushkin et al. | |
| 11,816,573 B1 * | 11/2023 | Garvey | G06F 40/279 |
| 11,961,005 B1 | 4/2024 | Lum et al. | |
| 2009/0271345 A1 * | 10/2009 | Rich | G06F 16/951 |
| | | | 706/46 |
| 2015/0254555 A1 | 9/2015 | Williams et al. | |
| 2016/0350369 A1 * | 12/2016 | He | G06F 16/2456 |
| 2017/0236060 A1 | 8/2017 | Ignatyev | |
| 2018/0004722 A1 * | 1/2018 | Naor | G06F 16/93 |
| 2019/0205794 A1 | 7/2019 | Hsu et al. | |
| 2019/0332697 A1 * | 10/2019 | Williams | G06F 16/2365 |
| 2019/0340240 A1 * | 11/2019 | Duta | G06V 30/15 |
| 2020/0207358 A1 | 7/2020 | Katz et al. | |
| 2020/0250491 A1 | 8/2020 | Peng et al. | |
| 2020/0401948 A1 | 12/2020 | Ma et al. | |

(Continued)

OTHER PUBLICATIONS

Office Communication for U.S. Appl. No. 18/544,043 mailed Mar. 8, 2024, 14 Pages.

*Primary Examiner* — Alex Gofman
(74) *Attorney, Agent, or Firm* — John W. Branch; Branch Partners PLLC

(57) ABSTRACT

Concrete data types for raw data organized in one or more columns of one or more tables may be determined. Functional data types for the one or more columns may be determined based on the raw data and the concrete data types such that a portion of the one or more columns may be associated with an identifier data type. Relationships between the one or more tables may be determined based on the portion of the one or more columns associated with the identifier data type. A schema representing the raw data may be generated based on the one or more relationships and the one or more tables.

27 Claims, 14 Drawing Sheets

(56) References Cited

U.S. PATENT DOCUMENTS

| | | |
|---|---|---|
| 2021/0073669 A1 | 3/2021 | Banerjee et al. |
| 2021/0232966 A1 | 7/2021 | Elisha et al. |
| 2022/0027782 A1 | 1/2022 | Mac Manus et al. |
| 2022/0058504 A1 | 2/2022 | Malhotra et al. |
| 2022/0101180 A1 | 3/2022 | Bhide et al. |
| 2022/0180200 A1 | 6/2022 | Yu et al. |
| 2022/0222526 A1 | 7/2022 | Hawkins et al. |
| 2022/0350967 A1 | 11/2022 | Vijayaraghavan et al. |
| 2023/0057414 A1 | 2/2023 | Larkin et al. |
| 2023/0062114 A1* | 3/2023 | Rout ............... G06F 16/906 |
| 2023/0099164 A1* | 3/2023 | Buford ............ G06F 16/215 |
| | | 707/692 |
| 2023/0142105 A1 | 5/2023 | Pita et al. |
| 2023/0196115 A1 | 6/2023 | Arnon et al. |
| 2023/0289587 A1 | 9/2023 | Shen et al. |
| 2023/0297653 A1 | 9/2023 | Das et al. |
| 2023/0306445 A1 | 9/2023 | Kaitha |
| 2023/0315811 A1 | 10/2023 | Chai et al. |
| 2023/0342344 A1* | 10/2023 | Brown ............ G06F 16/2255 |
| 2023/0368043 A1 | 11/2023 | Macklin et al. |
| 2023/0377747 A1 | 11/2023 | Molero Leon et al. |
| 2023/0401829 A1 | 12/2023 | Liu et al. |
| 2023/0409766 A1 | 12/2023 | Narayana et al. |
| 2024/0037145 A1 | 2/2024 | Ziccardi et al. |
| 2024/0040201 A1 | 2/2024 | Lee et al. |

\* cited by examiner

SCHEMA INFERENCE SYSTEM

TECHNICAL FIELD

These innovations relate generally to data management, and more particularly, but not exclusively, to schema inference systems.

BACKGROUND

Organizations are generating and collecting an ever increasing amount of data. Data may be directly or indirectly generated from disparate parts of the organization, such as, consumer activity, manufacturing activity, customer service, quality assurance, or the like. For various reasons, it may be difficult for such organizations to effectively utilize their vast collections of data. In some cases, the quantity of data may make it difficult to effectively utilize the collected data to improve business practices. In other cases, the data collected by different parts of an organization may be stored in different formats or stored in different locations. Further, employees within the organization may not be aware of the purpose or content of the various data collections stored throughout the organization. Accordingly, it may be difficult to understand or reason about some or all of the data collections without time consuming manual interventions. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
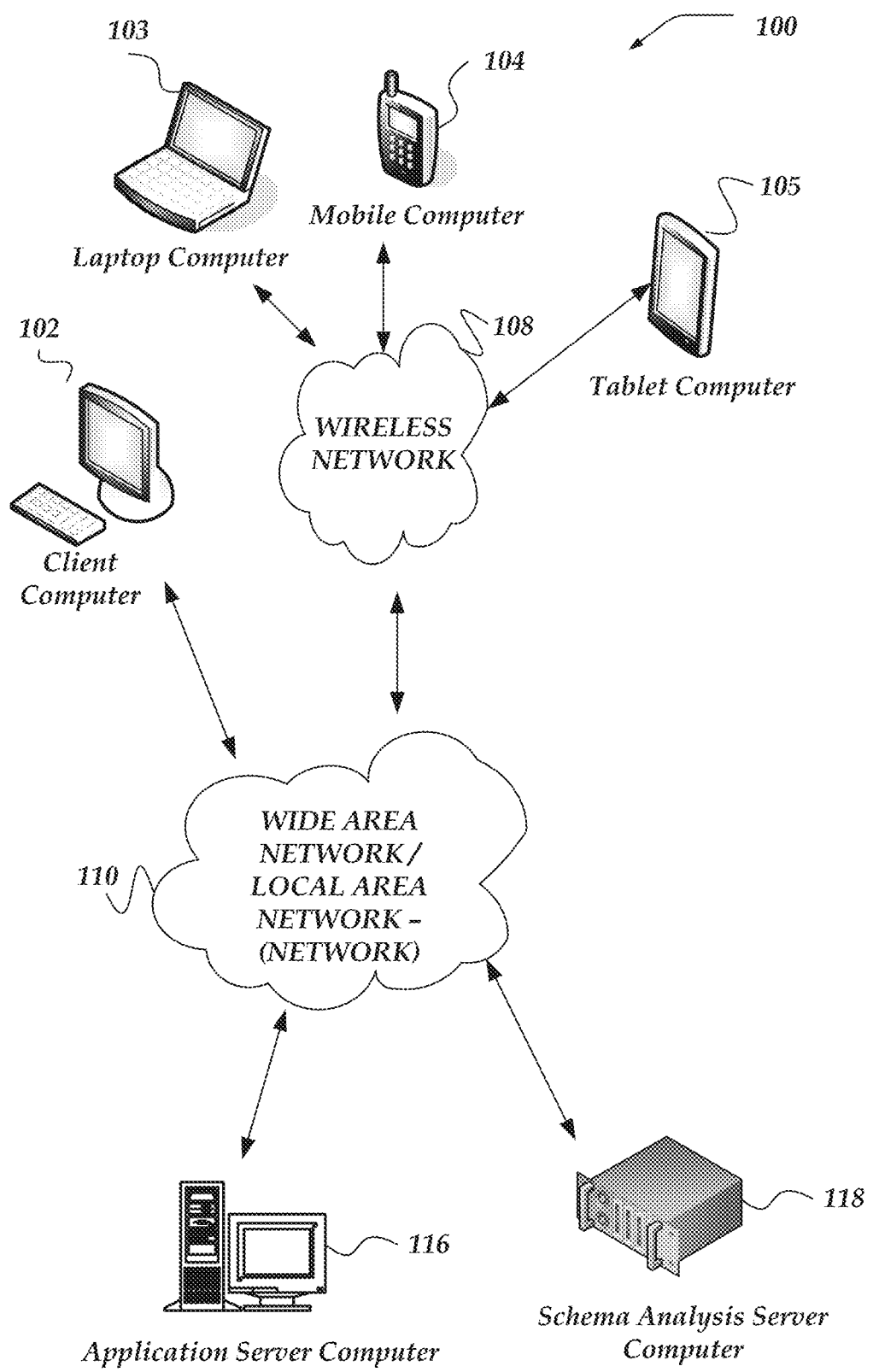
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable mediums or computer storage devices and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the term "prompt" refers to one or more data structures that contain or represent prompt information that may be provided to LLMs.

As used herein the term "concrete data type" refers to data types such as integers, floating point values, characters/bytes, strings, or the like, that may be associated with a data column. Concrete data types may conform to well-known rules or conventions that may be tested to determine if data represents a given concrete data type.

As used herein the term "functional data type" refers to a data type that represents how a concrete data typed column may be used or reasoned about. In some cases, different columns each having a concrete data type of integer may be designed for different types of usage. Accordingly, these different columns may be associated with different functional data types that represent how the data may be used. For example, functional data types consistent with the concrete data type integer may include identifiers, categories, timestamps, amounts, or the like.

As used herein the term "evaluator" refers to one or more data structures or containers with logic embedded in hardware or software instructions, not unlike engines described above. Evaluators may be directed to determining data metrics, collecting evidence regarding data types or relationships in ingest data. In some cases, evaluators may be specialized for different types of evaluations. For example, in some embodiments, evaluator specializations may include: concrete data type evaluators designed to collect evidence for inferring concrete data types of data columns; functional data type evaluators designed to collect evidence for inferring functional data types of data columns; relationship evaluators designed to collect evidence for inferring relationships in ingested data.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data. In one or more of the various embodiments, one or more concrete data types for raw data organized in one or more columns of one or more tables may be determined.

In one or more of the various embodiments, one or more functional data types for the one or more columns may be determined based on the raw data and the one or more concrete data types such that a portion of the one or more columns may be associated with an identifier data type.

In one or more of the various embodiments, one or more relationships between the one or more tables may be determined based on the portion of the one or more columns associated with the identifier data type.

In one or more of the various embodiments, a schema representing the raw data may be generated based on the one or more relationships and the one or more tables.

In one or more of the various embodiments, one or more queries that include one or more join expressions that are based on the one or more relationships may be provided. In some embodiments, the schema may be validated based on an execution of the one or more queries such that the validation may be based on an absence of errors associated with the execution of the one or more queries.

In one or more of the various embodiments, one or more data sources may be employed to provide the raw data such that the raw data includes one or more of a comma separated value file, a spreadsheet, an extensible markup language file, a database export file, an application export file, a network connection to data source, or the like.

In one or more of the various embodiments, determining the one or more concrete data types may include: determining one or more evaluators that declare one or more operations to infer the one or more concrete data types; inferring the one or more concrete data types based on the one or more operations such that the one or more concrete data types include one or more of an integer type, a floating point type, a string type, a boolean type, or the like; or the like.

In one or more of the various embodiments, determining the one or more functional data types may include: determining one or more evaluators that declare one or more operations to infer the one or more functional data types; inferring the one or more functional data types based on the one or more operations such that the one or more functional data types may include one or more of the identifier data type, a category data type, a text data type, a numeric data type; or the like.

In one or more of the various embodiments, one or more metrics associated with the one or more columns may be determined based on the raw data such that the one or more metrics include one or more of a row count, a median value, a mean value, a cardinality, a distribution of values, or the like. In some embodiments, a profile for each column may be provided such that the one or more metrics for each column may be included in the profile. In some embodiments, the profile for each column may be employed to further determine the one or more concrete data types or the one or more functional data types.

In one or more of the various embodiments, a portion of the one or more relationships may be determined based on an evaluation of header information associated with the one or more columns such that the portion of the one or more relationships may be associated with a portion of the one or more columns that may be associated with related header information.

In one or more of the various embodiments, a portion of the one or more relationships may be determined based on an evaluation of one or more statistical features of a portion of the raw data associated with the portion of the one or more relationships.

In one or more of the various embodiments, a portion of the one or more relationships may be determined based on an evaluation of one or more semantic characteristics of the one or more columns such that the evaluation of one or more semantic characteristics may be based on a response from a large language model that may be trained by a prompt that includes information associated with the one or more columns.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, schema analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, schema analysis server computer 118, or other computers.

Client computers 102-105 may further be configured to include a client application that enables an end-user to log into an end-user account that may be managed by another computer, such as application server computer 116, schema analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to schema analysis server computer 118. Also, client computers may be arranged to enable users to display reports, interactive user-interfaces, results provided by schema analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, schema analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and schema analysis server computer 118 are described in more detail below in conjunction with FIG. 3. Although FIG. 1 illustrates application server computer 116, or schema analysis server computer 118 each as a single computer, the innovations or embodiments are not so limited. For example, one or more functions of application server computer 116, or schema analysis server computer 118, or the like, may be distributed across one or more distinct network computers. Moreover, in one or more embodiments, schema analysis server computer 118 may be implemented using a plurality of network computers. Further, in one or more of the various embodiments, application server computer 116, or schema analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
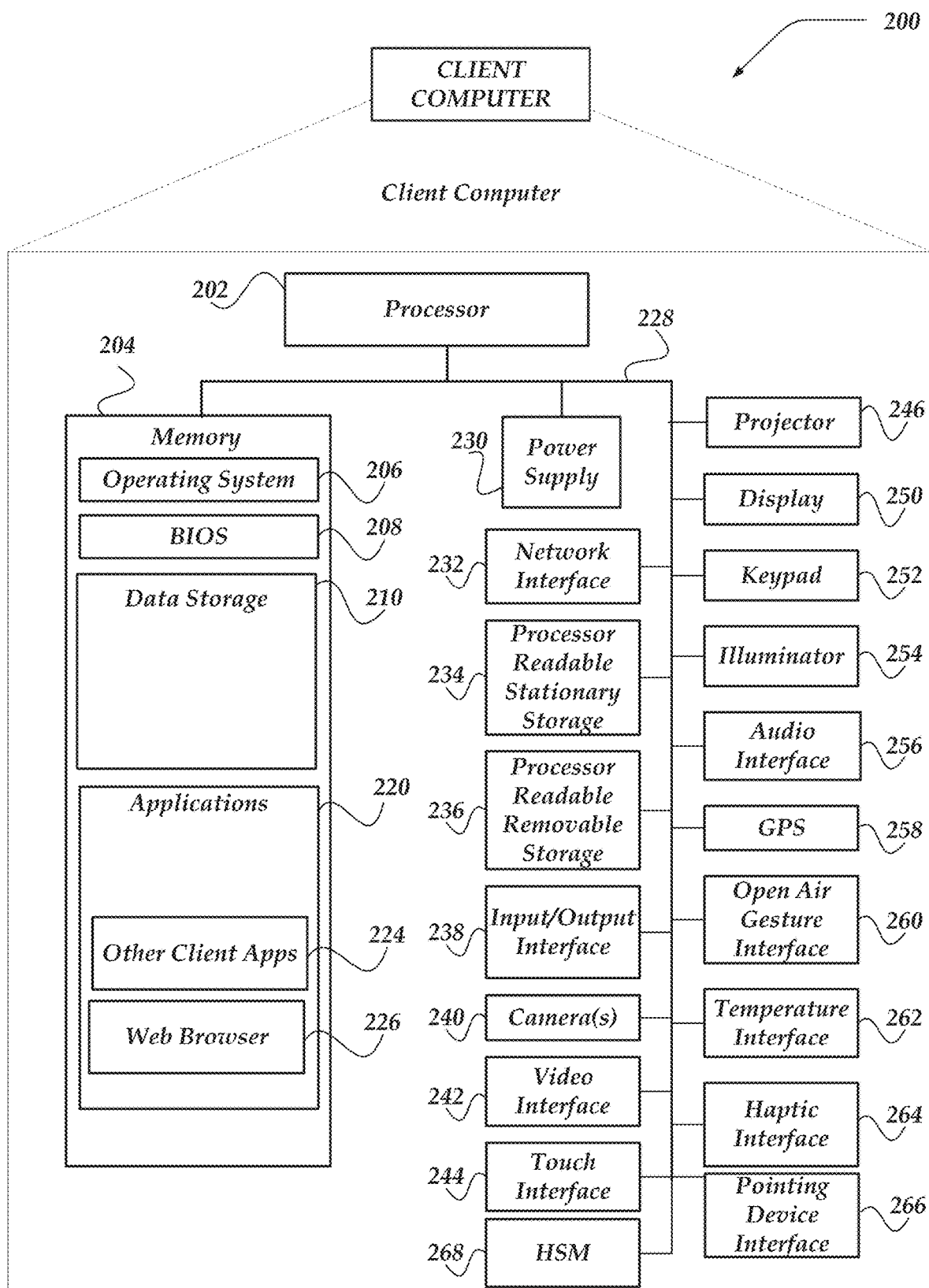
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
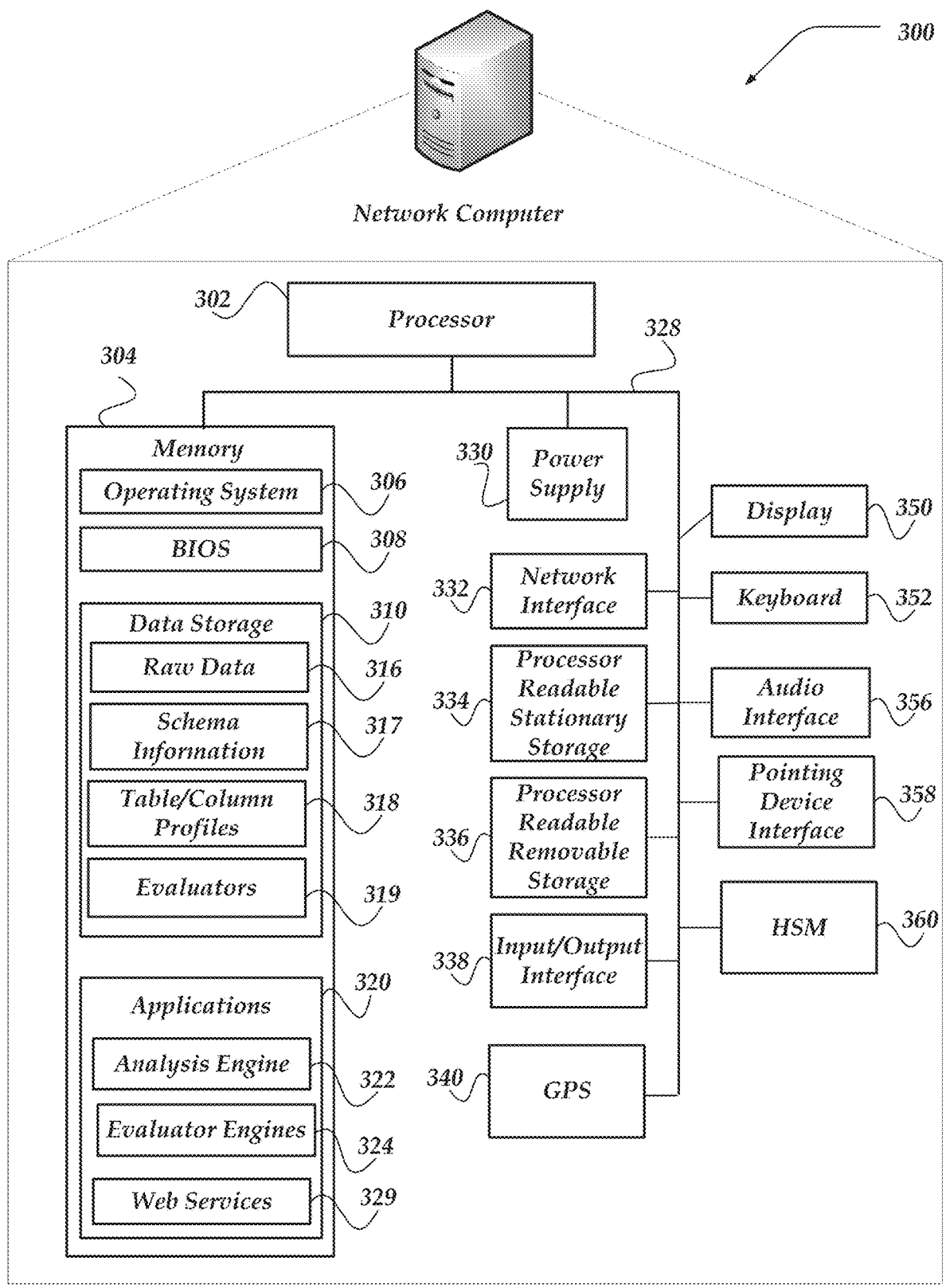
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, schema analysis server computer 118 shown in FIG. 1.

As shown in the figure, network computer 300 includes a processor 302 that may be in communication with a memory 304 via a bus 328. In some embodiments, processor 302 may be composed of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, evaluator engines 324, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, raw data 316, schema information 317, table/column profiles 318, evaluators 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, evaluator engines 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, evaluator engines 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, evaluator engines 324, web services 329, or the like, may be provisioned and de-commissioned automatically.

Also, in one or more of the various embodiments, analysis engine 322, evaluator engines 324, web services 329, or the like, may be located in virtual servers running in a cloud-based computing environment rather than being tied to one or more specific physical network computers. Likewise, in some embodiments, one or more of analysis engine 322, evaluator engines 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
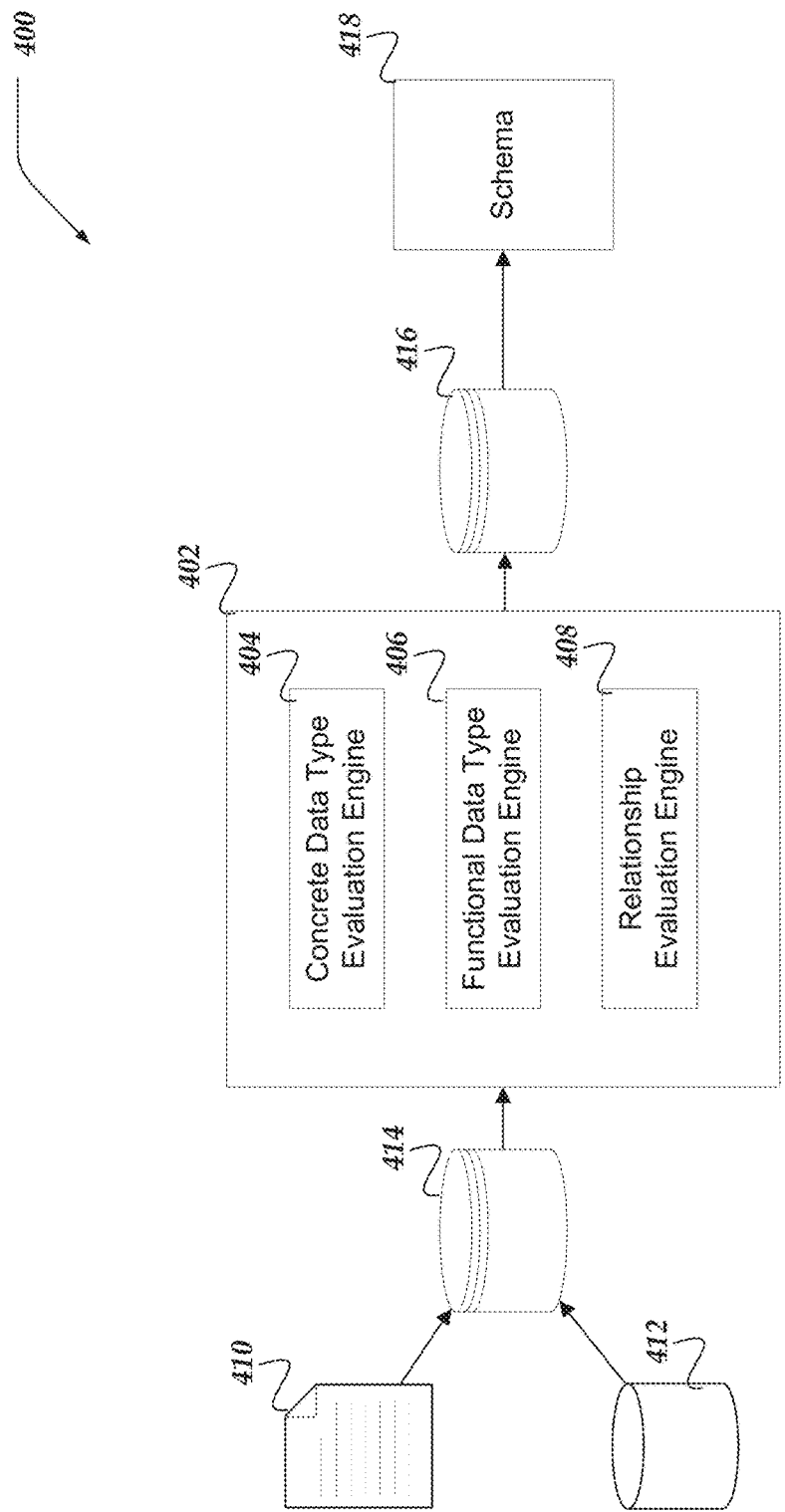
FIG. 4 illustrates a logical architecture of a system for schema inference system in accordance with one or more of the various embodiments.

FIG. 4 illustrates a logical architecture of system 400 for schema inference system in accordance with one or more of the various embodiments. Organizations often generate or collect large disparate collections of data related to operations, sales, customers, employees, or the like. These wide ranging data collections may be leveraged by organizations to improve business practices, train machine-learning models, improve messaging, understand customers, evaluate sales or marketing strategies, or the like. However, often organizations generate data using various services, applications, or the like. Also, in some cases, this data may be collected in disparate data sources, such as databases, log files, event archives, or the like.

In most cases, it may be necessary or useful to store the ingested data in a single logical (perhaps sharded or distributed) database to enable effective or efficient exploitation of the data. However, in some cases, because the ingested data may come from different sources, analysis engines may be arranged to analyze the ingested data to determine schema information that may authoritatively represent the ingested data.

For example, in some cases, available schema documentation for the raw data may be unavailable, disjoint, incorrect, out-of-date, and so on. Also, in some cases, some entities, tables, columns, or the like, included in the raw data may have changed since authoritative documentation was produced. Accordingly, in some cases, an important part of data ingestion may include determining consistent concrete data types, functional data types, or relationships associated with the ingested data. For example, data mining, training machine learning models, or the like, based on ingested data may require a detailed understanding of the data types or relationships among the entities represented by the data.

Accordingly, in one or more of the various embodiments, systems, such as system 400 may be arranged to automatically determine or infer schemas based on raw data being ingested.

In one or more of the various embodiments, analysis engines, such as analysis engine 402 may be arranged to include various evaluation engines, including concrete data type evaluation engine 404, functional data type evaluation engine 406, or relationship evaluation engine 408. In some embodiments, evaluation engines may be arranged to execute one or more evaluators directed to determining data types, relationships, various data metrics, or the like, from the raw data. Accordingly, in some embodiments, individual evaluators may be considered data structures that store or organize instructions, rules, classifiers, heuristics, libraries, interfaces, or the like, for conducting the evaluations.

In some embodiments, raw data, represented here by raw data file 410 or raw data source 412, may be collected into a temporary data store, such as data store 414. In some embodiments, data stores such as data store 414 may be configured to store raw data in a single location. However, in some embodiments, data source 414, or the like, may be configured to store the raw data while not enforcing (or requiring) strict schemas or definite data types. One or more conventional or custom facilities may be employed to gather raw data from various data sources of an organization. For example, in some embodiments, raw data may be provided from operational databases, log files, spreadsheets, database export files, CSV files, XML files, or the like. In some cases, organizations may provide raw data that has been exported from services or applications in various formats. In some embodiments, raw data 410 or raw data 412 may represent raw data that may have been collected or exported using one or more ETL (extract-transform-load) processes that may present the raw data in tabular formats that may enable table level, column level, or field level analysis of the raw data.

Accordingly, in one or more of the various embodiments, analysis engine 402 may be arranged to employ one or more evaluators to generate table profiles or column profiles that may be populated with information about the tables or columns. Such information may include metrics determined from executing various analysis operations on the associated tables or columns. See below for more detail.

In some embodiments, analysis engines may be arranged to interpret the table profiles or column profiles to determine an authoritative schema, such as schema 418 that represents the ingested data. Also, in some embodiments, a database, such as database 416 may be generated to store the raw data as transformed into actionable data for an organization. Accordingly, in some embodiments, as analysis engines determine the concrete data types, functional data types, and relationships included in the raw data, analysis engines may be arranged to modify or update a database, such as, database 416 may be modified to reflect these determinations.

In one or more of the various embodiments, concrete data type evaluation engines, such as concrete data type evaluation engine 404 may be arranged to employ one or more concrete data type evaluators to determine (or confirm) concrete data types of data columns. In some embodiments, concrete data types may be data types used by a target database for representing data in table columns. The particular types or type labels may vary depending on the features of the target database. Accordingly, in some embodiments, concrete data types may include: Integers, Numeric (floating point values, fixed point values, or the like), String, Boolean, Date/Time, or the like. Accordingly, in some embodiments, one or more concrete data type evaluators may be arranged to analyze columns of raw data to determine the concrete data type of the column. Note, in some cases, the raw data may include meta-data, or the like, that alleges a concrete data type for a column. However, in some cases, the concrete data type alleged by the raw data meta-data may not match the provided data. For example, if a raw data source declares that a column contains string values, the underlying application may be using those "string" columns for storing integer values.

Accordingly, in some embodiments, concrete data type evaluators may be arranged to generate various analytic metrics that may be evaluated to infer the concrete data type for a column. For example, in some embodiments, concrete data type evaluators directed to identifying integer columns may be arranged to execute one or more operations to test if the data for a column conforms to well-known rules for a given concrete data type. In some cases, such operations may include testing for one or more properties (mathematical or otherwise) that would be consistent with a given concrete data type. For example, in some embodiments, an integer data type evaluator may be arranged to test for various properties of integers to determine if integers are stored in a given column of data, such as, absence of decimal points or decimal places, restricted to numeric values, and so on. In some embodiments, evaluators may be arranged to employ system/native conversion functions that convert strings or character values into numbers. For example, a built-in string-to-integer conversion function may return an error if a provided string cannot be converted to an integer. Similarly, other tests may be performed to identify other concrete data types. For example, evaluators may be arranged to determine if a column holds strings by examining individual characters of the string to investigate if only alphabetic or alphanumeric values may be present.

In one or more of the various embodiments, more than one evaluator may be used to determine that same concrete data type. Also, in some embodiments, a single evaluator may be arranged to perform more than one test.

In some embodiments, one or more evaluators may be arranged to provide a score that indicates a confidence level for a concrete data type determination. In some embodiments, two or more evaluators may be arranged to provide partial confidence scores that may be combined into a total confidence score for a concrete data type determination.

In one or more of the various embodiments, analysis engines may be arranged to be adaptable such that different evaluators may be added to the system. Accordingly, in some embodiments, if improved heuristics, tests, classifiers, or the like, may be discovered, evaluators directed to the improved heuristics, tests, classifiers, or the like, may be employed. Accordingly, in some embodiments, analysis engines may be arranged to determine the particular evaluators for a given evaluation engine based on configuration information to account for local circumstances or local requirements.

However, in some embodiments, determining concrete data types may be necessary but not sufficient for understanding the raw data or reasoning about the raw data. While concrete data types may indicate several properties generally related to how the data may be represented or stored in a database, the same concrete data type may be used to represent different kinds of data. Accordingly, in some cases, operations that may be applicable to one kind of data may not be applicable to another kind of data even though both columns that are used to store this data may be represented using the same concrete data type. For example, in some cases, a column with a concrete data type of integer may be used for storing identifiers, category indicators, quantities, timestamps, or the like, each enabling different types of operations. For example, if the functional data type of a column with a concrete data type of integer is 'identifier', it may be inappropriate (nonsensical) to compute particular metrics, such as mean value, median value, sums, or the like.

Accordingly, in some embodiments, analysis engines may be arranged to evaluate the data to determine its functional data type as well as its concrete data type. Thus, in some embodiments, functional data types may be employed to determine some or all of the operations that may be allowed to be performed on or with data in particular columns.

In one or more of the various embodiments, analysis engines may be arranged to employ one or more functional data type evaluation engines, such as functional data type evaluation engine 406 for determining functional data types for data columns. Similar to determining concrete data types, functional data type evaluation engines may be arranged to employ one or more evaluators that may be arranged to execute one or more operations or tests to predict a functional data type for a given data column. Note, while the operations (e.g., the evaluators) may be different from those used for predicting concrete data types, functional data type evaluation engines may be considered to operate similarly to concrete data type evaluation engines. However, in some embodiments, functional data type evaluators may be arranged to perform operations that enable a prediction or inference of functional data types. For example, functional data type evaluators may include generating various metrics that may provide insight into the functional data type. For example, in some embodiments, if a column has a concrete data type of integer, metrics such as cardinality, distribution shape, or the like, may be considered to determine if the functional data type for an integer column may be an identity versus a quantity. For example, in some embodiments, columns that store identifiers may be expected to have a high cardinality while columns storing amounts may be expected to conform to one or more well-known probability distributions (e.g., normal distribution, poisson distributions, or the like.) Also, for example, comparing the cardinality of a suspected Identifier column to the count of items may provide evidence that the functional data type for a column is Identifier. For example, in some embodiments, if the cardinality of an integer column is within a defined range of actual student count, analysis engines or evaluators may be configured to infer that the functional data type for the column may be Identifier.

Further, in some embodiments, analysis engines may be arranged to employ relationship evaluation engines, such as, relationship evaluation engine 408 to identify data columns that may be primary keys, foreign keys, or the like, that represent relationships between different entities (tables). Similar to concrete data type evaluation engines or functional data type evaluation engines described above, relationship evaluation engines may be arranged to execute one or more evaluators to determine which columns in different tables may represent relationships between them.

In some embodiments, relationship evaluators may include one or more heuristics, classifiers, large language models, or the like, to predict which columns or different tables may correspond to relationships (if any) between one or more tables. Note, relationship evaluators may be arranged to execute a series of operations that may identify relationships by employing analytic analysis, statistical analysis, or the like, rather than employing resource intensive brute force methods such as executing "joins" for each column against each table.

In some embodiments, analysis engines may be arranged to employ database 416 to store ingested data after it has been analyzed. Note, in some embodiments, analysis engines may be arranged to modify or adapt database 414 as the analysis engines determine the types or relationships for the data rather than use a separate database.

In one or more of the various embodiments, analysis engines may be arranged to generate schema 418 based on the ingested raw data. In some embodiments, schemas may be configured to represent the tables, columns, and relationships that may be discovered from analyzing the raw data. Also, in some embodiments, schema 418 may be configured to include table profiles or column profiles that include some or all of the information determined by the analysis or information that supports the analysis.

In some embodiments, analysis engines may be arranged to provide schemas in various formats, including text files, XML files, JSON files, database schema files, or the like. In some embodiments, schemas may be considered data structures that include the information about the types or relationships derived from the ingested raw data. In some embodiments, analysis engines may be arranged to employ filters, templates, grammar, parsers, or the like, provided via configuration information to account for local circumstances or local requirements. For example, an organization may include configuration information that declares a new formatter/exporter if support for a new or different schema format may be required.

Figure 5:
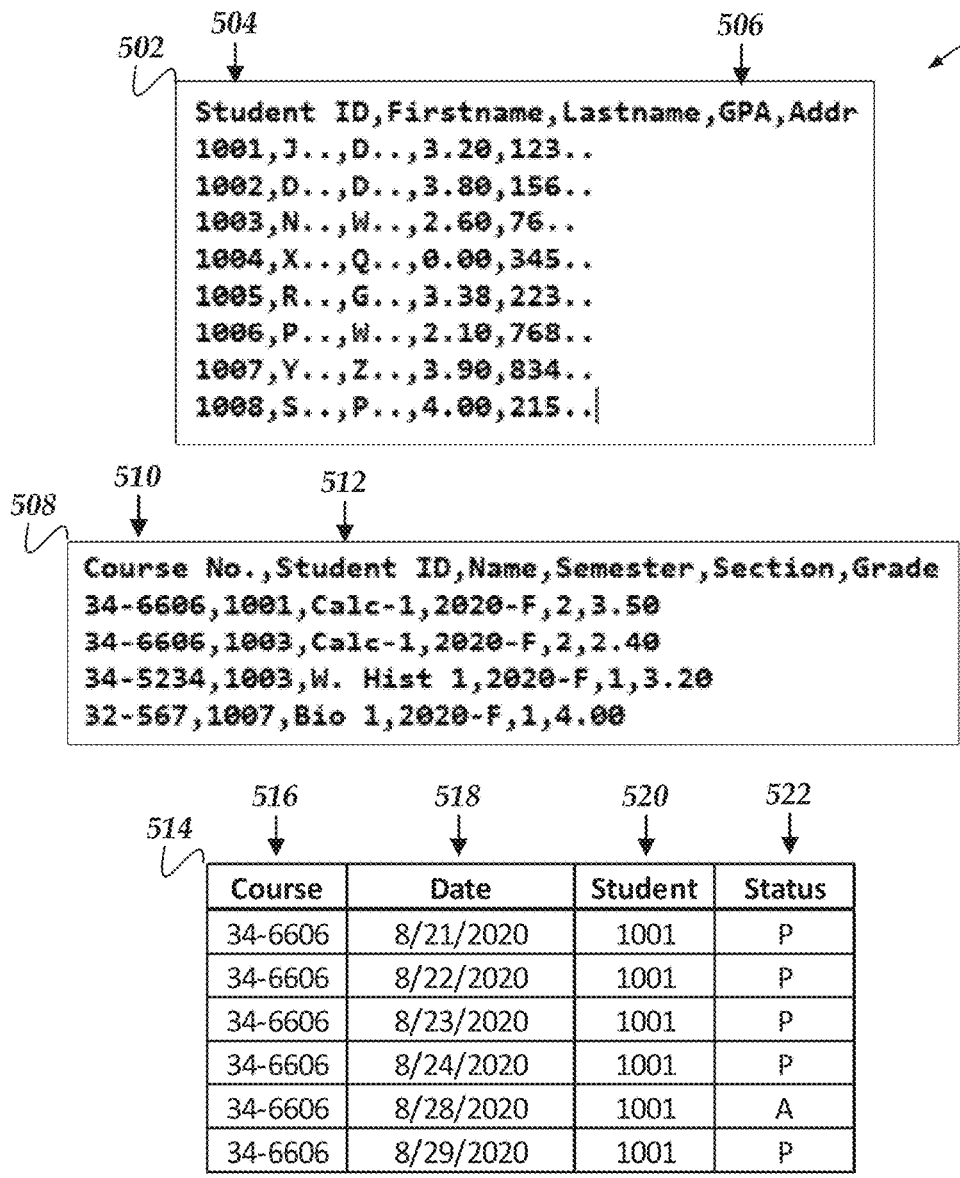
FIG. 5 illustrates a logical representation of a system for schema inference system in accordance with one or more of the various embodiments.
Figure 5:
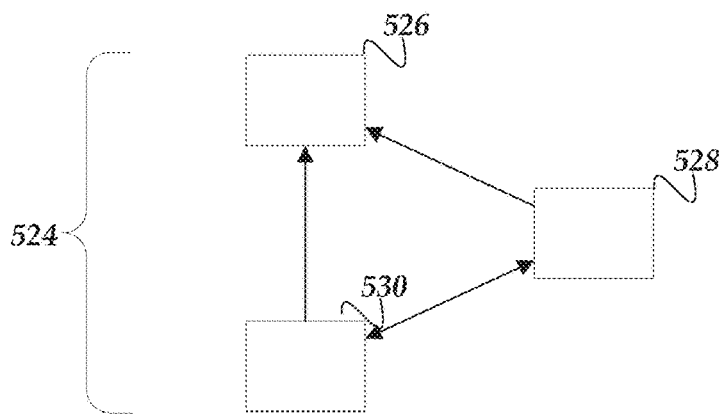

FIG. 5 illustrates a logical representation of system 500 for schema inference system in accordance with one or more of the various embodiments. In this example, for some embodiments, system 500 includes a portion of raw data that has been provided for ingestion by an analysis engine.

In this example, for some embodiments, table 502 represents a CSV file that includes data representing students. Accordingly, in some embodiments, column 504 and column 506 represent csv file headers that include labels of their respective columns. In this example, column 504 is a first column of csv file 502 representing student identifiers. And, in this example, column 506 represents a column for storing a student's cumulative grade point averages (GPA).

Also, in this example, for some embodiments, csv file 508 may be considered to represent raw data that include student grades for particular courses. In this example, column 510 represents an identifier for the courses and column 512 stores a student identifier.

Also, in this example, for some embodiments, table 514 represents a database table that stores attendance information for a course. Accordingly, in this example, for some embodiments, table 514 may include: column 516 that may be employed to store course identifiers; column 518 that may be employed to store a date (e.g., class date); column 520 that may be employed to store student identifiers; column 522 the may be employed to store a 'P' if the student was present or an 'A' if the student was absent.

As described above, in some embodiments, analysis engines may be arranged to analyze the raw data sources (e.g., file 502, file 508, table 514, or the like) to determine concrete data types, functional data types, or relationships that may be used to generate schema 524. Accordingly, in some embodiments, schema 526 may declare entity 526 to represent students, entity 528 to represent course grades, entity 528 to represent daily attendance for courses, or the like.

Note, one of ordinary skill in the art will appreciate that in production environments there may be 100s or 1000s of different files or tables representing arbitrary entities or relationships depending on local requirements or local circumstances. For brevity and clarity, system 500 is provided here to facilitate the discussion and description of innovations provided by schema inference systems. Accordingly, FIG. 5 and system 500 may be referred to below to illustrate the operation of the disclosed innovations.

Figure 6:
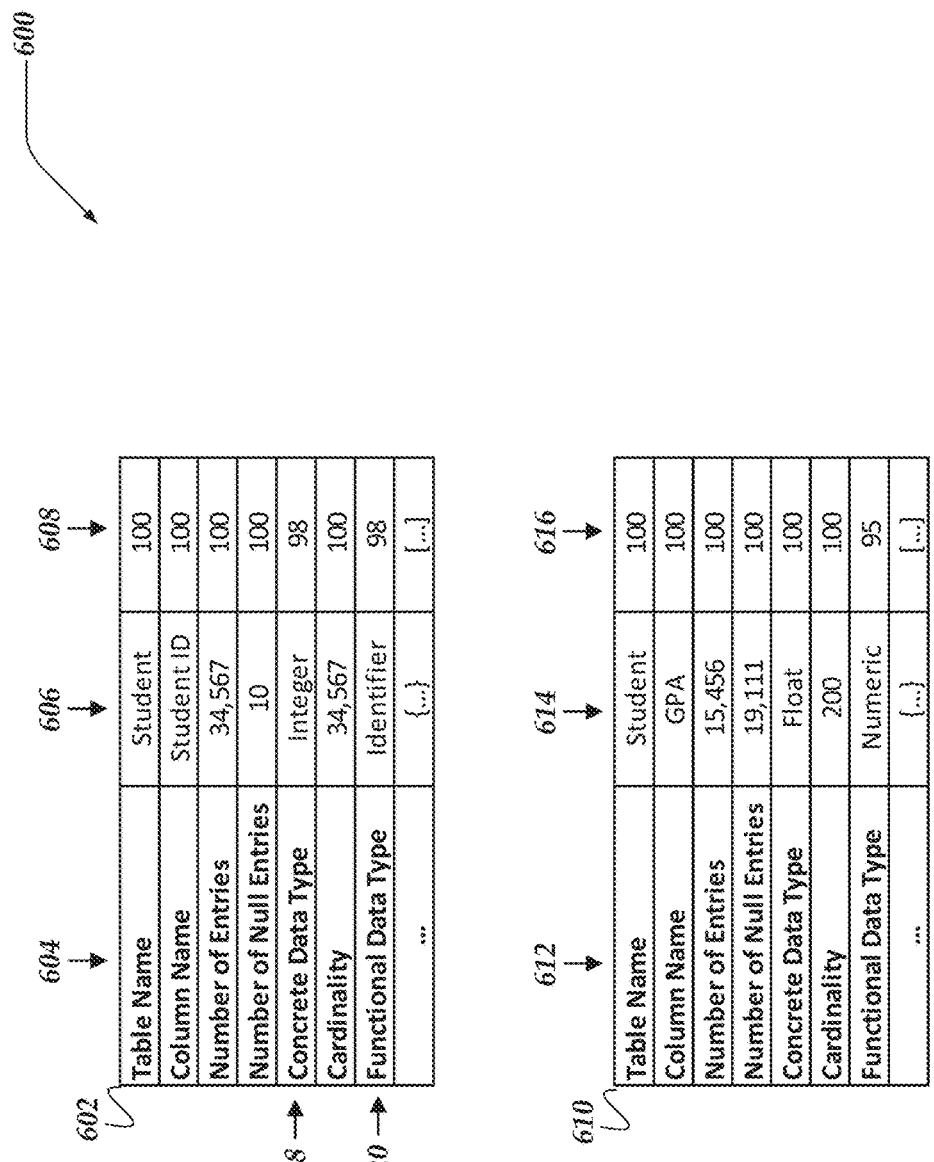
FIG. 6 illustrates a logical representation of profiles for schema inference system in accordance with one or more of the various embodiments.

FIG. 6 illustrates a logical representation of profile 602 and profile 610 for schema inference system in accordance with one or more of the various embodiments. As described above, in some embodiments, analysis engines may be arranged to generate table profiles or column profiles that include information about a particular column or table that has been ingested from raw data. In some embodiments, table profiles may be considered data structures that include information about a table and its columns and column profiles may be considered data structures that include information about columns or tables. Herein table profiles or column profiles may be considered synonyms in the sense that the information for evaluating columns (column profiles) may be used for evaluating both columns and tables and table profiles may be used for evaluating both tables and columns. Accordingly, unless explicitly stated or clear from the context, table profiles or column profiles may be assumed to be similar in usage or behavior within schema inference systems.

In some embodiments, column profiles, such as, column profile 602 may include information about various table attributes or various column attributes. Also, in some embodiments, column profiles may include metrics, statistics, or the like, that may have been generated by analysis engines during analysis or ingestion of raw data.

Accordingly, in this example, for some embodiments, column profile 602 includes: column 604 for storing profile attribute labels; column 606 for storing a determined, predicted, or inferred value for a given attribute; column 608 for storing confidence scores that may indicate the veracity of a given determination, predictions, or inference. In this example, column profile 602 may include attributes or metrics for a column labeled Student ID in a table labeled Student.

Likewise, in this example, for some embodiments, column profile 610 includes: column 612 for storing attribute labels; column 614 for storing a determined, predicted, or inferred value for a given attribute; column 616 for storing confidence scores that may indicate the veracity of a given determination, predictions, or inference. In this example, column profile 610 may include attributes or metrics for a column labeled GPA in a table labeled Student.

As described above, for some embodiments, profile fields, such as: profile field 618 stores the inferred concrete data type (e.g., Integer); profile field 620 stores the inferred function data type; or the like. In some embodiments, other fields may store other attributes, such as, number of entries, number of null entries, cardinality, or the like, that may be computed, predicted, or inferred by one or more evaluators or the analysis engine itself.

In one or more of the various embodiments, analysis engines (or evaluators) may be arranged to employ column profiles to infer or predict concrete data types, functional data types, or the like.

Figure 7:
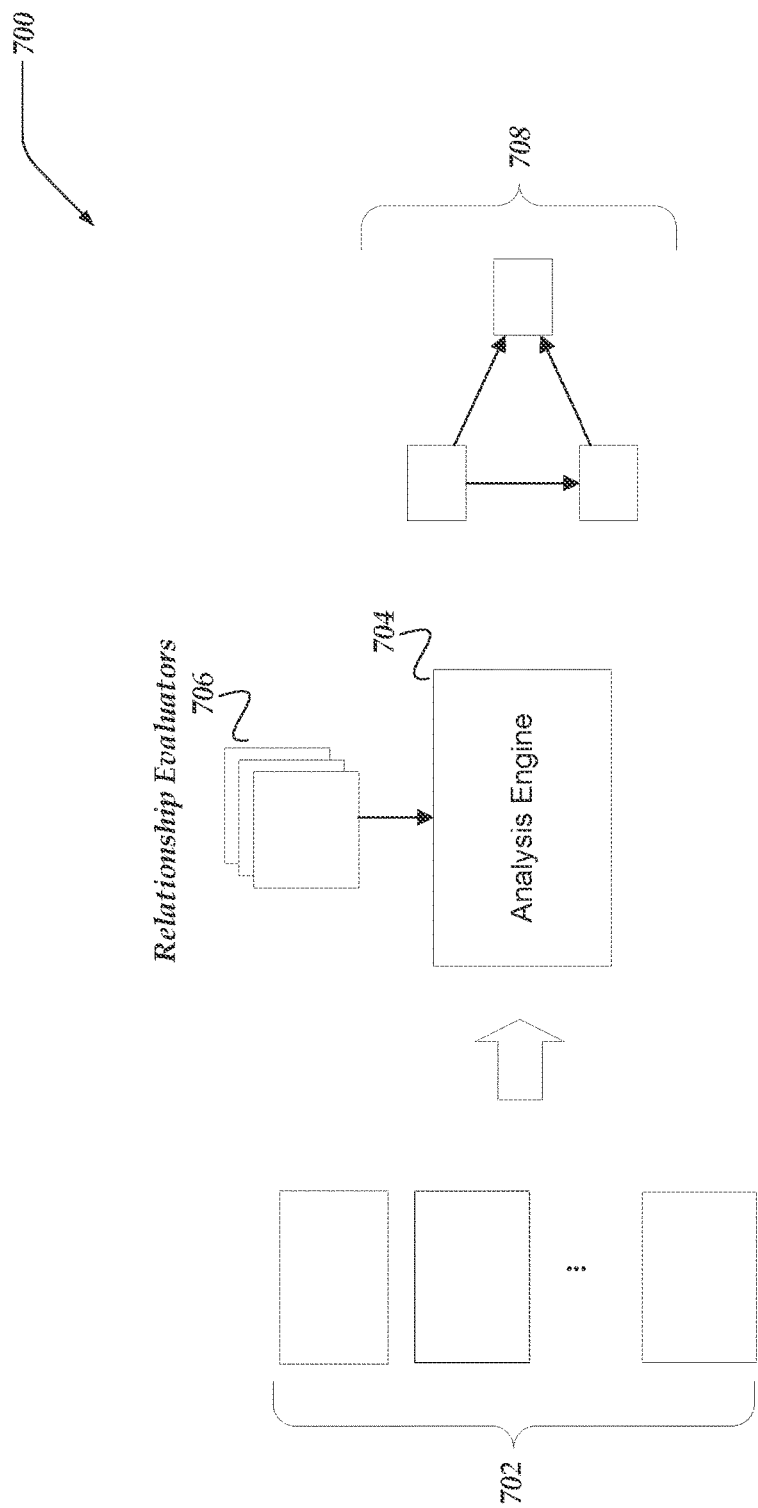
FIG. 7 illustrates a logical schematic of a system for schema inference in accordance with one or more of the various embodiments.

FIG. 7 illustrates a logical schematic of system 700 for schema inference in accordance with one or more of the various embodiments. As described above, in some embodiments, column profiles or table profiles, such as column profiles 702, may be provided to analysis engine 704 for determining relationships between or among table/entities that were included in the ingested data. Accordingly, in some embodiments, analysis engines may be arranged to employ one or more relationship evaluators, such as relationship evaluators 706 to determine, infer, or predict one or more relationships between tables or entities corresponding to column profiles, such as column profiles 702.

In some embodiments, if analysis engines may complete the evaluation of the profile information associated with the ingested data, the analysis engines may be arranged to generate schema information, such as, schema 708 that represents the ingested data. As described above, schema information may include concrete data types, functional data types, or relationships that may be inferred or predicted by analysis engines.

In some embodiments, the particular format of schema 708 may vary depending on the target database, or the like. Also, in some embodiments, analysis engines may be arranged to provide schema information in a standard or common format such that the analysis engines or other services may be employed to convert schema information into a format targeted for particular databases, visualization tools, data analysis tools, or the like. In some embodiments, analysis engines may be arranged to rules, filters, transformers, or the like, provided or defined in configuration information to account for local requirements or local circumstances. For example, if an organization intends to use a new or different database, filters or transformers that may format schema information to match the new or different database may be declared, defined, or included in configuration information.

Figure 8:
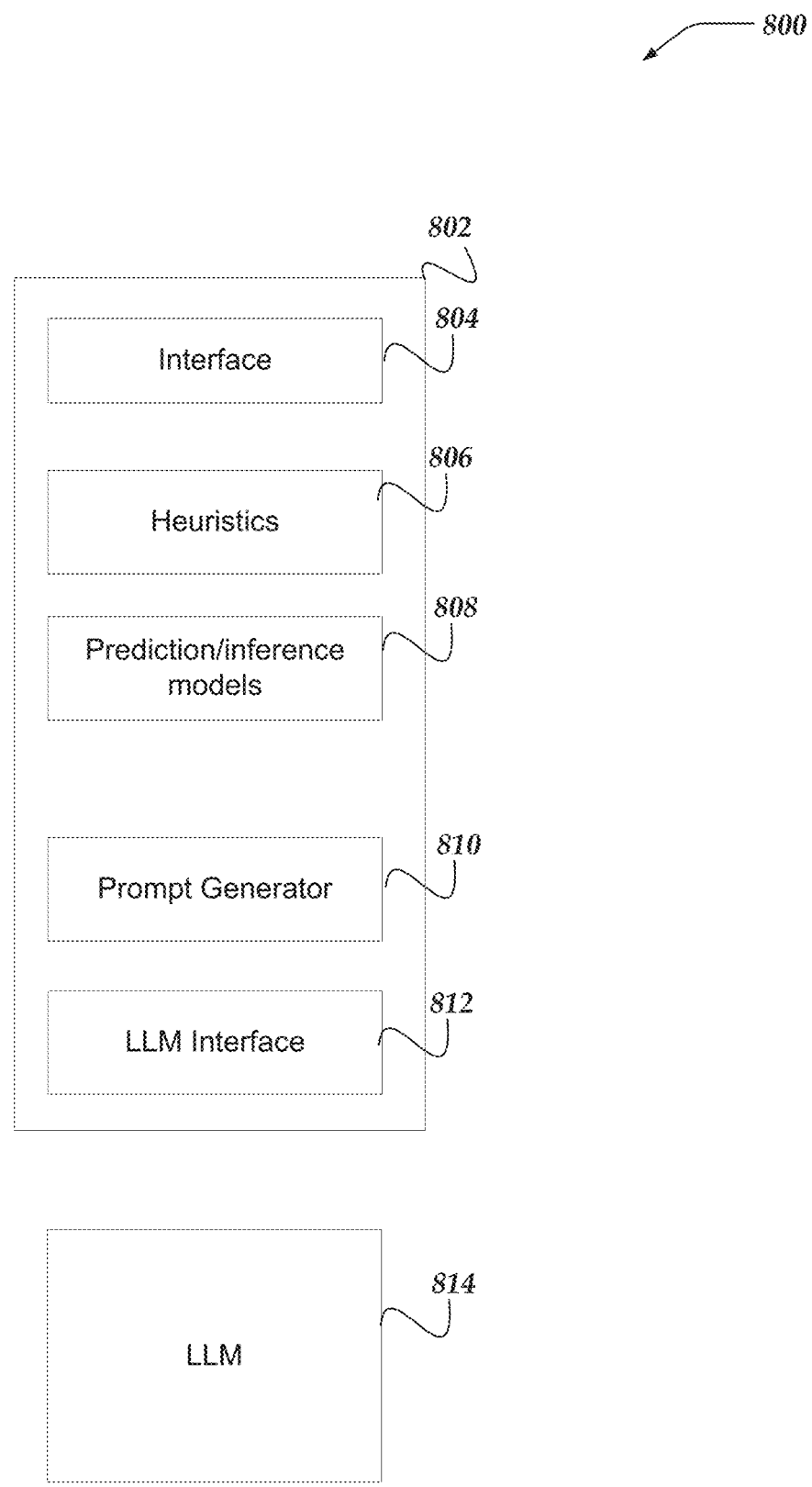
FIG. 8 illustrates a logical schematic of an evaluator for schema inference in accordance with one or more of the various embodiments.

FIG. 8 illustrates a logical schematic of evaluator 800 for schema inference in accordance with one or more of the various embodiments.

As described above, evaluators may be considered to be data structures that include the instructions, rules, libraries, interfaces, or the like, for evaluating ingested data to determine one or more metrics or infer one or more characteristics of tables, columns, fields, or the like, to enable other systems (including analysis engines) to reason about ingested data.

Accordingly, in one or more of the various embodiments, evaluators may be considered to comprise an evaluator container, such as, evaluator container 802, one or more interfaces, such as interface 804, one or more heuristic modules, such as heuristics 806, one or more prediction/inference models, such as prediction/inference models 808, or the like. Also, in some embodiments, evaluators may be arranged to perform one or more operations that employ large language models. Accordingly, in some embodiments, evaluators, such as evaluator 802 may include prompt generator module 810. Also, in some embodiments, prompt generator engines may be arranged to generate large language model prompts used for querying large language models to infer/predict one or more characteristics of tables, columns, or fields. Also, in some embodiments, if an evaluator may be arranged to employ large language models such as large language model 814, evaluators may be arranged to include interfaces, such as large language model interface 812 for providing prompts to large language models and receiving large language model responses.

In some embodiments, prediction/inference models such as prediction/inference models 808 may be configured to execute various operations to predict concrete data types, functional data types, or relationships. In some embodiments, heuristics 806 or prediction/inference models 808 may be considered the same component or otherwise perform similar operations.

Note, one of ordinary skill in the art will appreciate that evaluators may include more or fewer components in various arrangements without departing from the scope of these innovations. For brevity and clarity many variations of evaluators are not discussed here. However, evaluator 800 and its description here and elsewhere in this writing are at least sufficient to describe and disclose these innovations.

In some embodiments, evaluators may be arranged to execute particular tasks for schema inference. Accordingly, in some embodiments, some evaluators may include specialized instructions directed to those particular tasks. For example, an evaluator directed to inferring a concrete data type for a column may include operations that evaluate column features such as testing if values in the column meet one or more characteristics of known concrete data types. For example, an evaluator may include tests such as examining the character values that may make up field value. For example, if a field includes values that are composed of number/numeric characters (e.g., 0-9) an evaluator may infer that the concrete data type of a column is numeric. And, for example, if the values include decimal points or decimal places, the concrete data type may be inferred to be floating point values rather than integers. Likewise, for example, if an evaluator determines that field values may be composed of alphabetic characters, the concrete data type may be inferred to be string, or the like.

Figure 9:
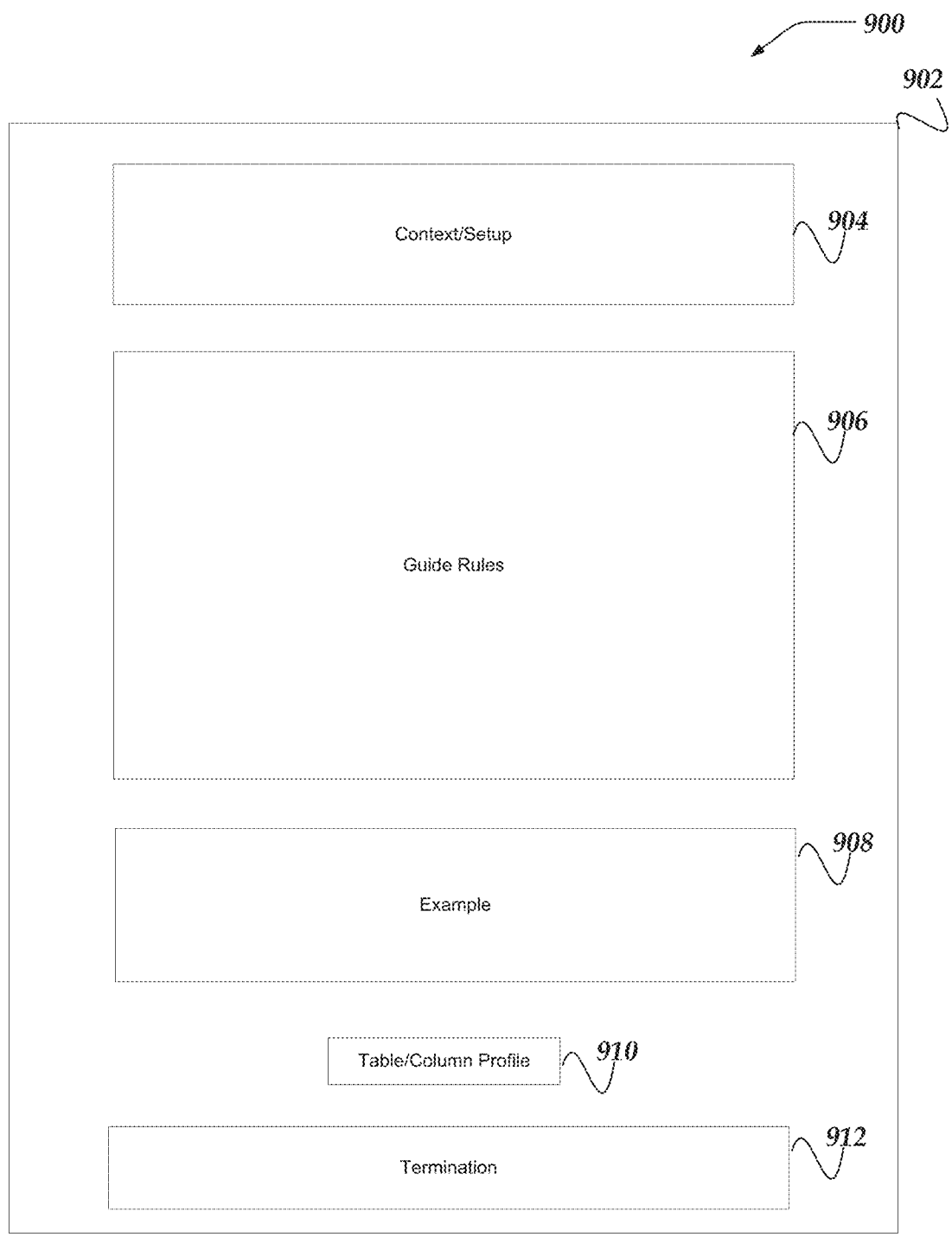
FIG. 9 illustrates a logical schematic of a prompt for schema inference systems in accordance with one or more of the various embodiments.

FIG. 9 illustrates a logical schematic of prompt 900 for schema inference systems in accordance with one or more of the various embodiments. As described above, some evaluators (namely relationship evaluators) may be arranged to generate prompts that may be provided to large language models. Accordingly, in some embodiments, these evaluators may be arranged to generate prompts based on prompt templates or prompt patterns that may include the particular instructions for inducing a large language model to generate a given response.

One of ordinary skill in the art will appreciate that the particular contents or text included in prompts or prompt templates may vary depending on various factors, including, the large language model (e.g., different types/version/brands may require different prompt templates), format or content of table/column profiles, or the like. In general, prompt templates may be developed experimentally such that prompt templates may produce prompts that may train large language models to evaluate column profiles that conform to the requirements of the analysis engine.

In some embodiments, prompt templates may be included in a prompt template repository or other data store. In some cases, employing prompts to train a more generalized language model to provide particular result that the language model may not explicitly be trained or tuned for may be referred to as zero- or few-shot learning because the generalized language model (referred to herein as large language models) is trained by the contents of the prompts. Accordingly, in some embodiments, large language models that consume prompts may perform transfer learning, or the like, to provide specific results, such as predicting relationships based table/column profile information.

Accordingly, in some embodiments, the particular contents of prompt templates or prompts may depend on semantic understanding capabilities of the underlying large language model. Thus, in some cases, different large language models may require different prompt templates. Further, in some embodiments, different large language models may be configured for different target audiences, problem domains, or the like. Accordingly, in some embodiments, analysis engines or evaluators may be arranged to select among multiple large language models depending on the profile information, network resources, cost considerations, performance considerations (e.g., latency, context size restrictions), or the like.

In some embodiments, prompt templates may comprise a dataset container, such as, container 902 that may hold the contents (e.g., text or audio) for the prompt. Also, in some embodiments, prompt templates may be configured to include various sections, including, for example, context section 904, guide rule section 906, example section 908, table/column profile information 910, termination section 912, or the like. In some cases, for some embodiments, prompt templates may omit one or more sections. Likewise, in some embodiments, prompt templates may include one or more other sections. Further, in some cases, prompt templates may arrange the various sections in a different order than shown here. Thus, in some embodiments, policy engines may be arranged to employ different prompt templates for different problems, different evaluators, or different large language models as needed.

In one or more of the various embodiments, dataset containers may be variables, parameters, objects, data structures, or the like, that enable the prompts to be passed to a large language model. In some cases, for some embodiments, a dataset container may be a buffer of text characters that form a string collection that may be included in the prompt. Likewise, for example, a dataset container may be an object or class instance designed for handling the types of content (e.g., string, audio, or the like) included in a particular prompt.

In one or more of the various embodiments, context sections such as context section 904 may be portions of a prompt template that inject statements that establish a working context that may aid in the immediate training of the large language model to evaluate the table/column profiles. For example, in some embodiments, context sections may be employed to declare one or more features or characteristics of relationships. Accordingly, in some embodiments, large language models may incorporate this context information as part of the generative process that is trained to infer or predict relationships or other schema information that may be associated with the ingested data.

In one or more of the various embodiments, guide rule sections such as guide rule section 906 may be portions of a prompt template that inject one or more statements that may be selected to provide additional guidance or direction for training the large language model to generate schema information. For example, in some embodiments, guide rules may include statements that declare rules for omitting certain types of punctuation, omitting in-depth explanation text from large language model responses, directives to specifically or particularly take actions if certain words or text forms are encountered while generating schema information, or the like.

In one or more of the various embodiments, example sections such as example section 908 may be portion of a prompt template that include one or more examples of the schema information (e.g., relationships) and one or more example schema portions or profiles that may correspond to the example schema information. In some embodiments, if needed, the example information may guide the training of the large language model to generate schema information that conforms to the requirements of the analysis engine.

In one or more of the various embodiments, table/column profile placeholders such as table/column policy placeholder 910 may be specialized tokens, markers, mark-up, or the like, that indicate where in prompt template to inject the schema profile information that should be embedded in the prompt before provided the prompt to the large language model.

In one or more of the various embodiments, termination sections such as termination section 912 may be a portion of a prompt template that includes additional context information or guide rules that may be required to "close" the prompt. For example, for some embodiments, termination sections may include a text statement indicating the large language model should end the text generation session, or the like.

Generalized Operations

FIGS. 10-14 represent generalized operations for schema inference systems in accordance with one or more of the various embodiments. In one or more of the various embodiments, processes 1000, 1100, 1200, 1300, or 1400 described in conjunction with FIGS. 10-14 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 10-14 may be used for schema inference systems in accordance with at least one of the various embodiments or architectures such as those described in conjunction with FIGS. 1-9. Further, in one or more of the various embodiments, some or all of the actions performed by processes 1000, 1100, 1200, 1300, or 1400 may be executed in part by analysis engine 322, evaluator engines 324, or the like, running on one or more processors of one or more network computers.

Figure 10:
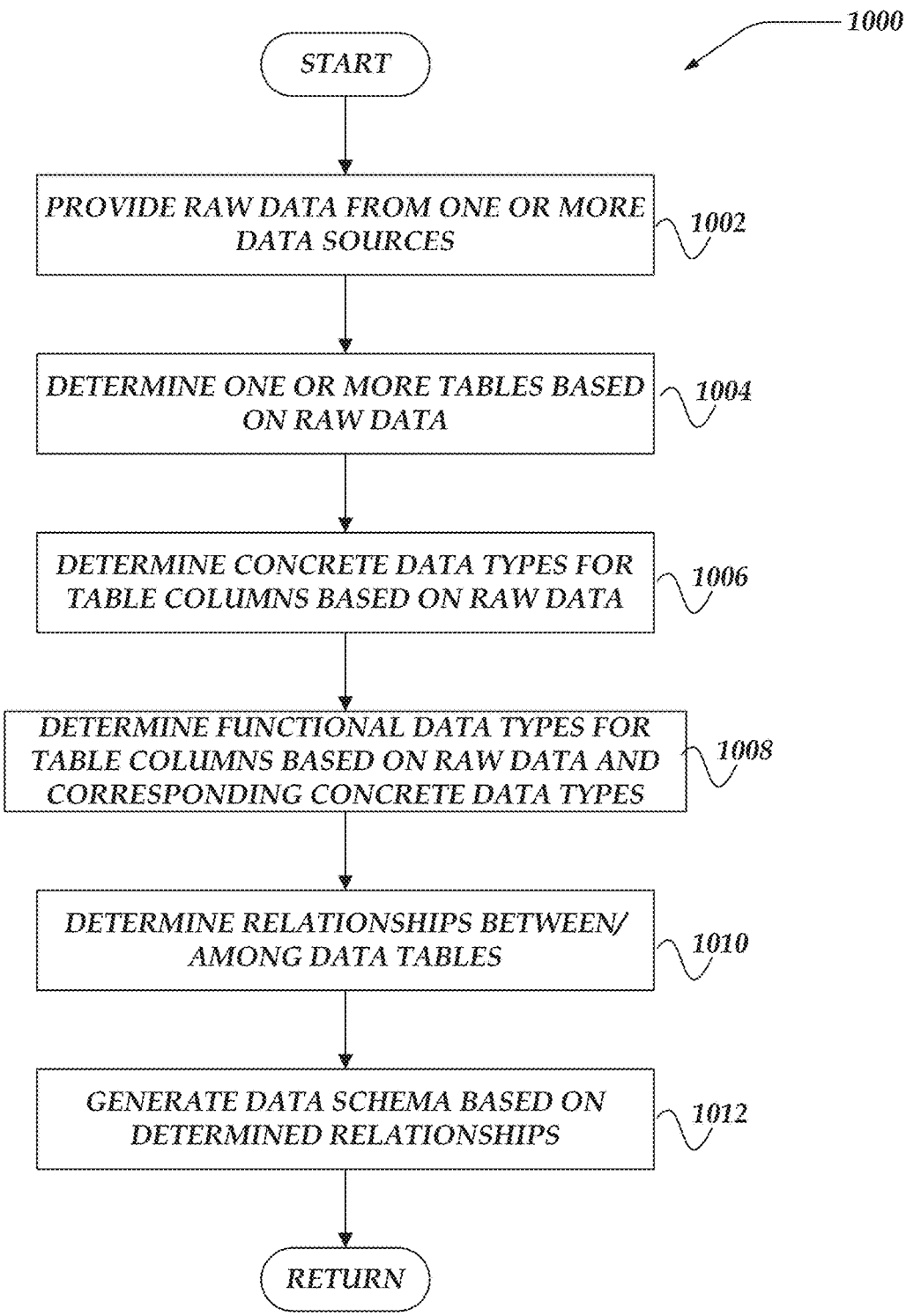
FIG. 10 illustrates an overview flowchart of a process for schema inference systems in accordance with one or more of the various embodiments.

FIG. 10 illustrates an overview flowchart of process 1000 for schema inference systems in accordance with one or more of the various embodiments. After a start block, at block 1002, in one or more of the various embodiments, raw data from one or more data sources may be provided to analysis engines. As described above, organizations may selectively provide data to analysis engines. In some embodiments, this raw data may be exported from databases, applications, or the like. In some cases, the raw data may include log files, event histories, message archives, data in spreadsheets, CSV files, XML files, JSON files, or the like. Also, in some cases, for some embodiments, some raw data, unstructured or otherwise, may be provided after some amount of data cleaning, formatting, or the like, (ETL).

In some embodiments, analysis engines may be arranged to load the raw data into one or more temporary databases that enable the data to be stored and accessed absent a complete understanding of the concrete data types, functional data types, or relationships that may correspond to the provided raw data. Also, in some embodiments, analysis engines may be arranged to store some of the provided data in generic tables or generic columns such that as more details are inferred about the data, the data store that may be storing the provided raw data may be updated or adapted accordingly. For example, in some embodiments, an analysis engine may be configured to initially copy raw data into tables that are configured to store strings such that actual strings, numeric values, identifiers, and so on may be stored as strings. Accordingly, in some embodiments, as analysis engines determine more information about the data (e.g., concrete data types, functional data types, or relationships), analysis engines may be arranged to update the tables or columns to reflect the determined concrete data types, functional data types, or relationships.

At block 1004, in one or more of the various embodiments, analysis engines may be arranged to determine one or more tables based on the raw data. In some embodiments, analysis engines may be arranged to group raw data into tables based on the source of the raw data or the format of the raw data.

In some embodiments, analysis engines may be configured to interpret some data sources such that each file may be stored in its own table. Also, in some embodiments, if the raw data may be provided in a database export it may declare tables that the analysis engine may duplicate for storing the raw data. In some embodiments, analysis engines may be arranged to provide one or more user interfaces that enable users to interactively set import configuration settings. Accordingly, in some embodiments, analysis engines may enable users to assign data to tables on a file-by-file basis, by file-type, by source, or the like.

At block 1006, in one or more of the various embodiments, analysis engines may be arranged to determine one or more concrete data types for one or more table columns based on the raw data. In some embodiments, analysis engines may be arranged to include one or more evaluation engines that may execute one or more evaluators. Accordingly, in some embodiments, analysis engines may be arranged to employ concrete data type evaluators to predict the concrete data type for columns in the ingested data.

In some embodiments, one or more concrete data type evaluators may be arranged to generate a confidence score that indicates the 'confidence' that the evaluator has in a given prediction. Note, in some cases, one or more evaluators may perform operations that are not based on statistics, modeling, predictions, or the like. In such cases, the confidence score may be omitted or set to a maximum value (e.g., 100%). For example, in some embodiments, if an evaluator may be arranged to count the number of empty or null values in the column, its confidence value may be expected to be 100%.

In some embodiments, multiple evaluators may be directed to the same concrete data type. In some embodiments, analysis engines may be arranged to apply more than one test to generate the evidence for inferring a particular concrete data type. In some embodiments, if multiple evaluators may be employed, evidence provided by each evaluator may be considered if generating a confidence score.

Also, in some embodiments, if one or more evaluators for the same data type may be employed, the weight or preference of one or more evaluators may be hierarchical such that one or more higher ranked evaluators may override the results of other evaluators.

In some embodiments, analysis engines may be arranged to configure or import one or more evaluators as different evaluation criteria may be determined. For example, by experimentation, an organization may discover improvements to evaluators that may be added to a schema inference system. Accordingly, in some embodiments, analysis engines may be arranged to load evaluators on-demand based on configuration information.

At block 1008, in one or more of the various embodiments, analysis engines may be arranged to determine one or more functional data types for one or more table columns based on the raw data and the one or more concrete data types. As described above, determining concrete data types may be necessary but not sufficient for understanding or reasoning about ingested data. Accordingly, in some embodiments, similar to employing concrete data type evaluators (as described above or elsewhere herein), functional data type evaluators may be employed to predict or infer functional data types for columns. In some embodiments, functional data type evaluators may be arranged to employ the data, one or more metrics associated with the data, or the like, to infer functional data types. Accordingly, in some embodiments, analysis engines may be arranged to employ one or more functional data type evaluators to test various conditions or assumptions that may align with a particular functional data type. For example, for some embodiments, one or more evaluators may be arranged to infer that columns that have low cardinality, among other characteristics, may be categories. Likewise, for example, if columns have cardinality values that approach the number of records in a table may be inferred in some cases to be Identifiers. Note, one of ordinary skill in the art will appreciate that various functional data types may require one or more different tests or evaluations that examine assumptions that may be associated with particular functional data types. One of ordinary skill in the art will appreciate that there may be an arbitrary number of different tests for an arbitrary number of functional data types. In some embodiments, as functional data types may be defined one or more tests for predicting or inferring those functional data types may be provided. For brevity and clarity, rather than describing the details of many functional data type tests it is assumed that one of ordinary skill in the art may determine different functional data types or tests for inferring functional data types to meet the local circumstances or local requirements.

At block 1010, in one or more of the various embodiments, analysis engines may be arranged to determine one or more relationships between or among the one or more tables. In one or more of the various embodiments, relationships may include circumstances where one or more columns in a table may include identifiers that reference records in other tables. In some cases, such relationships may be established based on keys, primary keys, foreign keys, or the like. In some embodiments, relationships reflect logical connections between entities in the data. For example, referring to FIG. 5, column 504, column 512 and column 522 may be assumed to store student identifiers (Student IDs). Accordingly, in this example, the relationships indicated by schema 524 may be based on determining that column 504, column 512, and column 522 are storing student identifiers.

Accordingly, in some embodiments, analysis engines may be arranged to employ one or more relationship evaluators to infer relationships in the data. Similar to concrete data type evaluators or functional data type evaluators described above, relationship evaluators may include instructions, heuristics, classifiers, rules, or the like, for determining if one or more columns in the data may represent relationships. In some embodiments, relationship evaluators may include evaluators that compare column headings/labels to each other to identify which columns (if any) may have headings or labels that conform to one or more common naming conventions (Student, Student_ID, or the like). Also, In some embodiments, one or more evaluators may be arranged to examine columns with functional data types of Identifier to determine if those values are used in other columns in other tables—which would imply a relationship. Also, in some embodiments, one or more evaluators may be arranged to generate prompts that may be provided to train (one-shot) large language models to predict relationships that may have been missed by other evaluators.

At block 1012, in one or more of the various embodiments, analysis engines may be arranged to generate a schema based on the ingested data and the one or more relationships. As described above, in some embodiments, analysis engines may be arranged to generate a schema representing the ingested data. In some embodiments, such schemas may be provided in various formats for various targets (e.g., one or more database platforms, visualization platforms, other analysis tools, or the like).

Next, in one or more of the various embodiments, control may be returned to a calling process.

Figure 11:
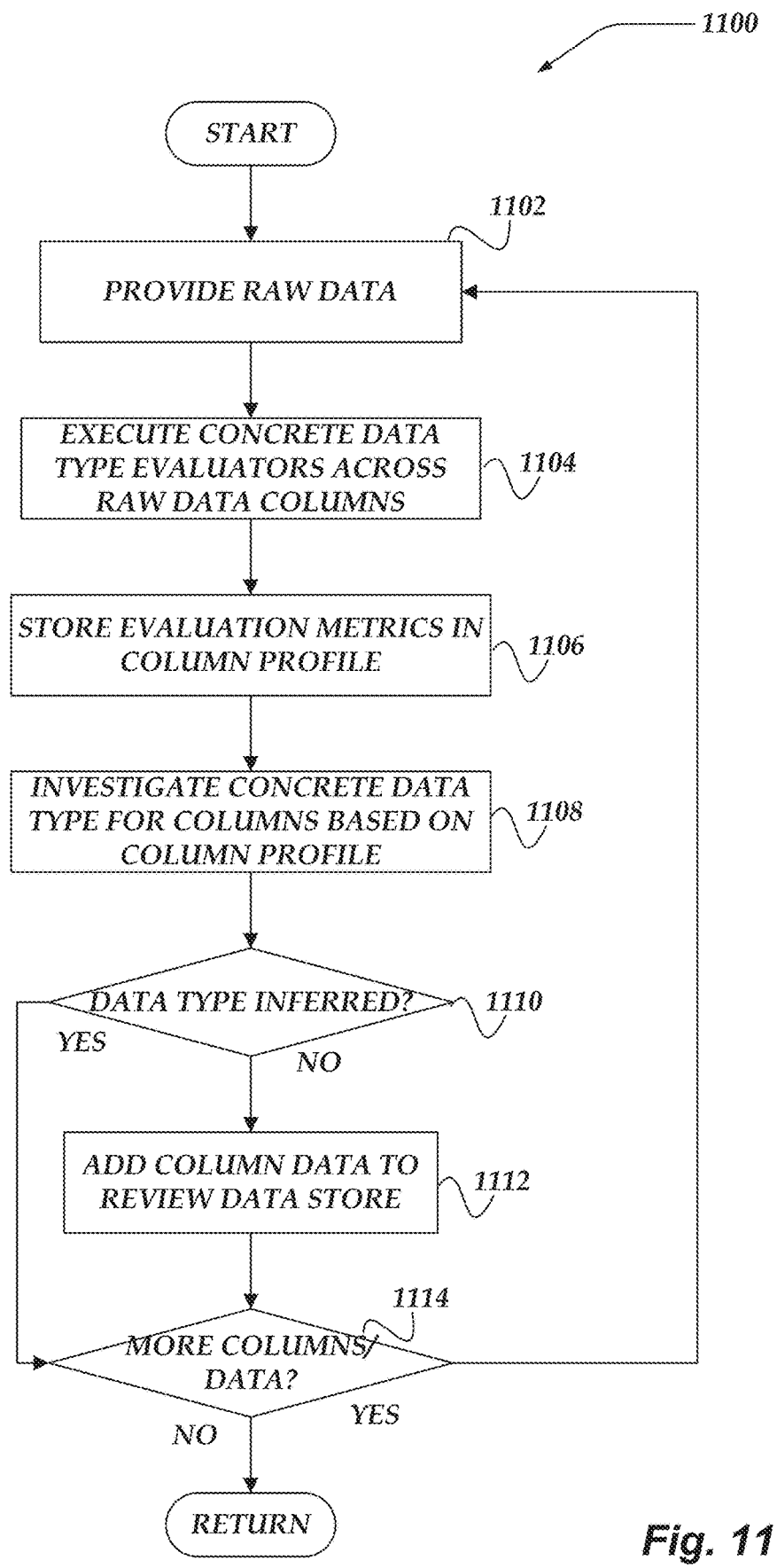
FIG. 11 illustrates a flowchart of a process for schema inference systems in accordance with one or more of the various embodiments.

FIG. 11 illustrates a flowchart of process 1100 for schema inference systems in accordance with one or more of the various embodiments. After a start block, at block 1102, in one or more of the various embodiments, raw data may be provided to analysis engines. As described above, raw data from one or more data sources may be provided to the analysis engines. In some embodiments, raw data may be arranged into tables either as exported from its source or by one or more ETL processes.

At block 1104, in one or more of the various embodiments, analysis engines may be arranged to execute one or more concrete data type evaluators across columns of the raw data. As described above, in some embodiments, analysis engines may be arranged to employ one or more evaluators to determine features or characteristics of columns or tables of ingested data.

In some embodiments, a portion of the evaluators may be arranged to examine columns to infer concrete data types that may be assigned to columns. In some embodiments, more than one evaluator may be applied to investigate the concrete data types of a column. Also, in some embodiments, one evaluator may be arranged to investigate more than one concrete data type.

In one or more of the various embodiments, one or more evaluators may be arranged to compute metrics or statistics either as a separate function or in the course of investigating concrete data types. For example, one or more evaluators may be arranged to generate metrics such as cardinality, mean values, median values, probability distributions, or the like.

Also, in some embodiments, analysis engines may be arranged to employ one or more evaluators for determining metrics that may be used for determining concrete data types, functional data types, or relationships. For example, an evaluator executed to determine the cardinality of a column may be employed up front such that other evaluators, such as concrete data type evaluators may use those metrics.

Also, in some embodiments, if one or more evaluators require metric values that may as of yet be unavailable, the evaluators may include or otherwise execute one or more actions to generate the needed metrics. For example, in some embodiments, if an evaluator does not have a required metric in the relevant column profile, the evaluator may be arranged to execute actions to generate the needed metric values.

At block 1106, in one or more of the various embodiments, analysis engines or evaluators may be arranged to store one or more metrics or other information determined by the one or more evaluators in a column profile.

In some embodiments, analysis engines may be arranged to maintain column profile or table profiles that store some or all of the metrics or other information (e.g., table names, column names, or the like) that may be determined for columns or tables.

At block 1108, in one or more of the various embodiments, analysis engines or evaluators may be arranged to infer concrete data type for column based on column profiles. As described above, concrete data type evaluators may be arranged to execute one or more operations to predict or infer the concrete data type for a column.

In some embodiments, evaluators may be arranged to provide a confidence score that indicates its own view of the accuracy of its inference or prediction. Accordingly, in some embodiments, the confidence score for one or more metrics may be stored in the column profile or table profile that corresponds to the column/table being evaluated.

At decision block 1110, in one or more of the various embodiments, if the concrete data type may be determined, control may flow to decision block 1114; otherwise, control may flow to block 1112. In some cases, for some embodiments, analysis engines or evaluators may fail to determine a concrete data type for a column. In some embodiments, one or more evaluators may be associated with a threshold value that provides a minimum confidence value to accept the inference determined during the evaluation.

At block 1112, in one or more of the various embodiments, analysis engines may be arranged to record information about the column to a review data store.

In some embodiments, records or columns associated with failed concrete data type prediction may be recorded in a separate data store or report for subsequent review by users or other evaluators. For example, an examination of the records that resisted concrete data type prediction may provide insights for providing new evaluators or modifying existing evaluators that may be successful in predicting the concrete data types in those cases.

Also, in some cases, rejected records may be determined to include incorrect (e.g., typos, or the like) data such that correcting the data may enable the concrete data type to be predicted.

At decision block 1114, in one or more of the various embodiments, if there may be more columns or more raw data to process, control may loop back to block 1102; otherwise, control may be returned to the calling process. Generally, process 1100 may continue until it is interrupted or aborted by a user or the ingested data has been fully evaluated.

Figure 12:
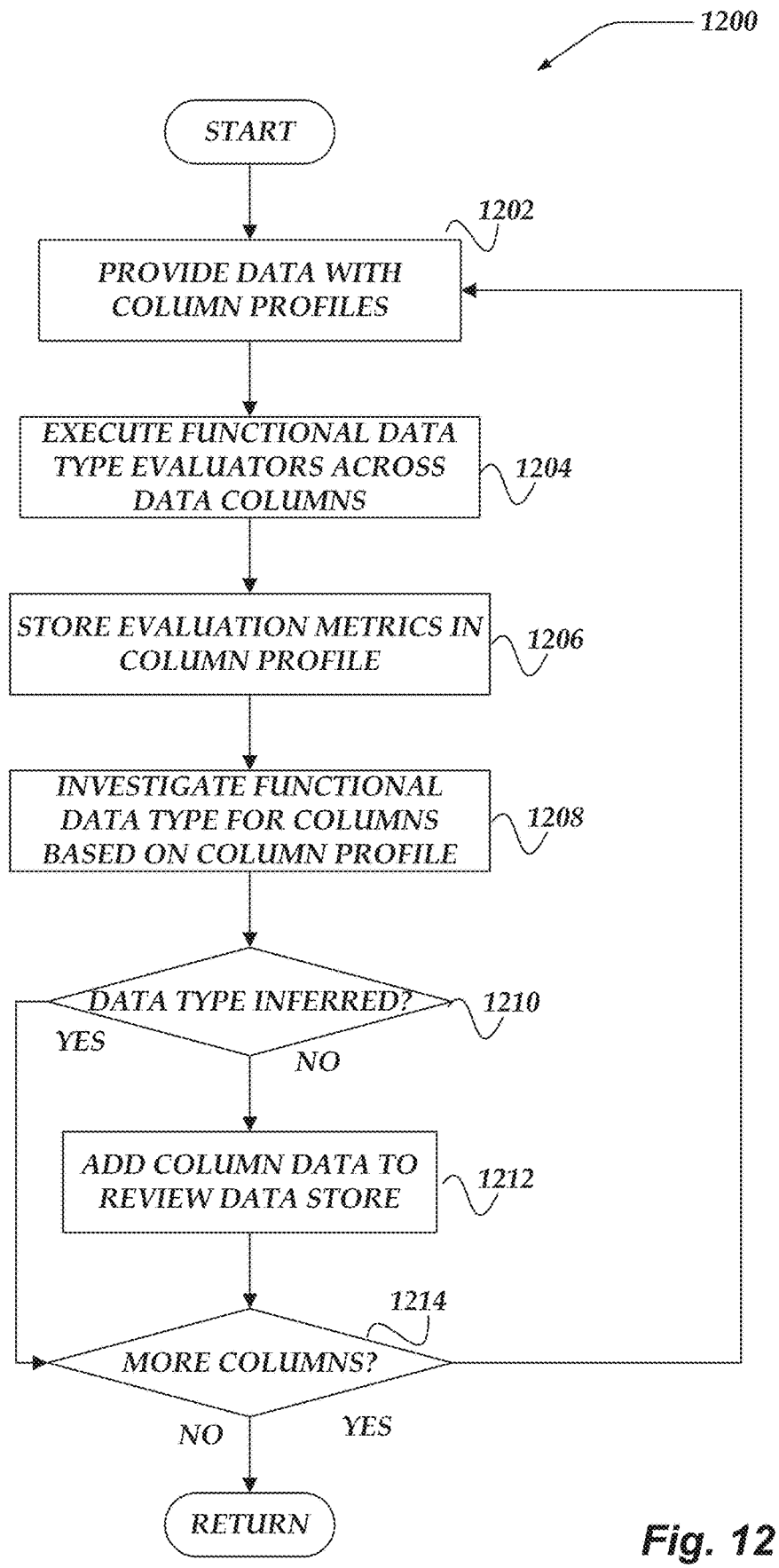
FIG. 12 illustrates a flowchart of a process for inferring functional data types for schema inference systems in accordance with one or more of the various embodiments.

FIG. 12 illustrates a flowchart of process 1200 for inferring functional data types for schema inference systems in accordance with one or more of the various embodiments. Note, in some embodiments, the process for inferring functional data types may be considered similar to the process for inferring concrete data types described above. Often the main difference between inferring concrete data types or inferring functional data types may be the tests or other operations performed by the evaluators. Accordingly, for brevity or clarity some redundant descriptions may be omitted here in view of the descriptions provided above.

After a start block, at block 1202, in one or more of the various embodiments, raw data with column profiles may be provided to analysis engines.

At block 1204, in one or more of the various embodiments, analysis engines or functional data type evaluators may be arranged to execute one or more functional data type evaluators across the one or more columns. As described above, functional data types may describe how values of a given concrete data type may be employed. Accordingly, in some embodiments, functional data types may include Identifiers, Timestamps, Categories, Amounts, or the like.

At block 1206, in one or more of the various embodiments, analysis engines or functional data type evaluators may be arranged to store one or more evaluation metrics in the column profile for the column being evaluated. Similar to how concrete data type evaluators may generate metrics and store them in column profiles, functional data type evaluators may be arranged to store metrics, other values (e.g., type names), or the like, in column profiles.

At block 1208, in one or more of the various embodiments, analysis engines may be arranged to infer the functional data type for the columns based on column profiles. Similar to concrete data type evaluators, functional data type evaluators may be arranged to execute various instructions, tests, rules, classifiers, or the like, that may be directed to providing evidence that a given column may have a given functional data type.

At decision block 1210, in one or more of the various embodiments, if the function data type may be determined, control may flow to decision block 1214; otherwise, control may flow to block 1212.

At block 1214, in one or more of the various embodiments, information about the column may be added to a review data store. Similar to how records with indeterminable concrete data types may be collected and reviewed, analysis engines or evaluators may be arranged to store records or values that have indeterminable functional data types may be recorded in a data store or report. In some embodiments, these data stores or reports may enable users or other services to review the reject records to determine a course of actions. For example, in some cases, records may be rejected because they contain incorrect or unexpected data. In such cases, users or other automatic services may be enabled to correct the data. Also, in some embodiments, a review of rejected records may provide insights that enable functional data type evaluators to be modified or corrected to account for the rejected records.

At decision block 1216, in one or more of the various embodiments, if there may be more columns to process, control may loop back to block 1202; otherwise, control may be returned to a calling process.

Figure 13:
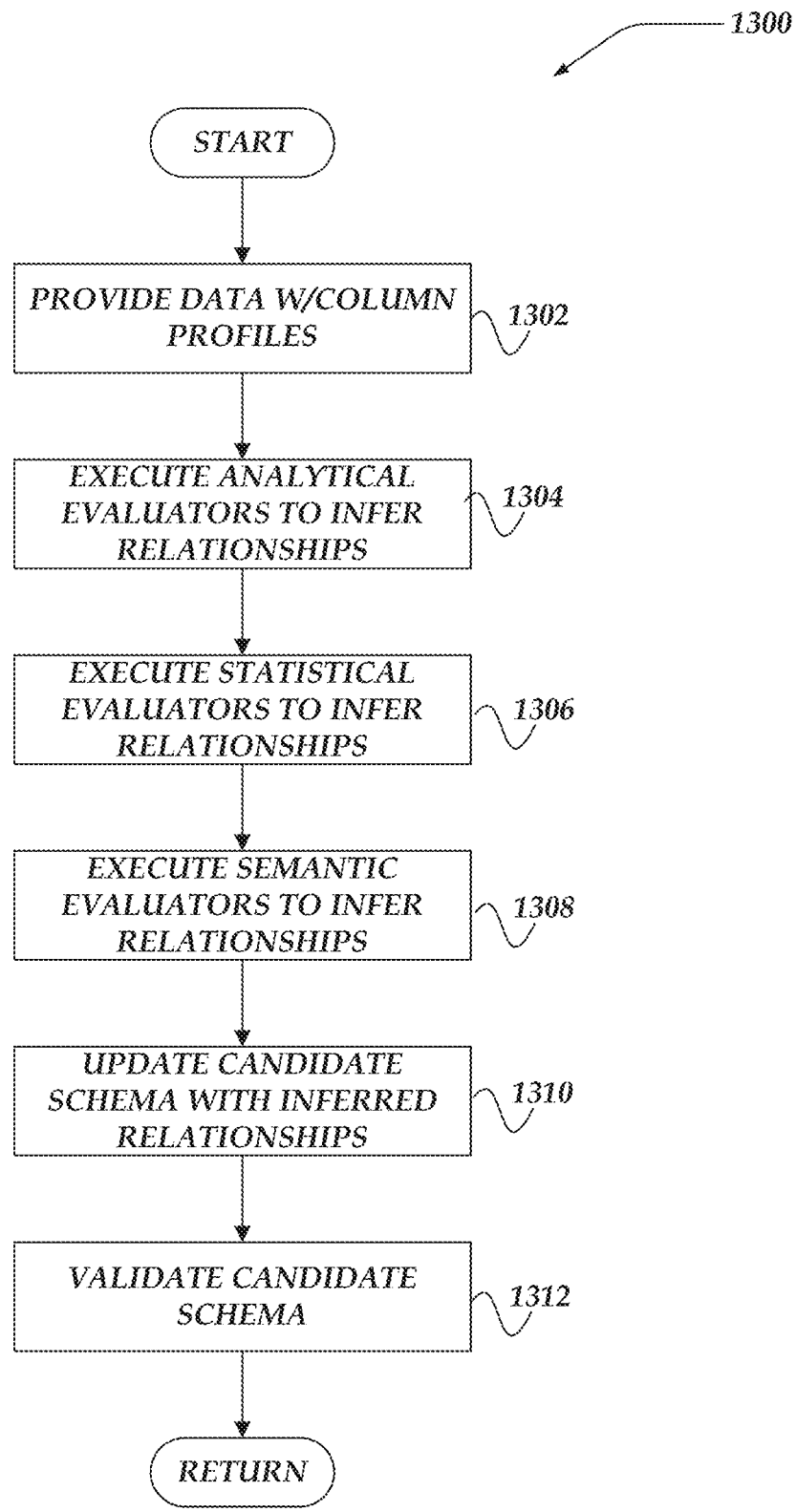
FIG. 13 illustrates a flowchart of a process for schema inference systems in accordance with one or more of the various embodiments.

FIG. 13 illustrates a flowchart of process 1300 for schema inference systems in accordance with one or more of the various embodiments.

After a start block, at block 1302, in one or more of the various embodiments, provide raw data with table/column profiles to analysis engines. Similar as described above, analysis engines may be provided data from one or more sources. In some embodiments, as described above, concrete data type evaluators or functional data type evaluators may determine one or more metrics or one or more characteristics for tables or columns of ingested data. These metrics or characteristics may be stored in column profiles (or table profiles).

At block 1304, in one or more of the various embodiments, analysis engines may be arranged to execute one or more analytic evaluators to infer one or more relationships in the data. In some embodiments, analytic evaluators may be arranged to examine table names, column headings, other meta-data, or the like, for determining if relationships exist in the ingested data.

In some embodiments, analytic evaluators may be arranged to compare column labels to examine if two or more columns of different tables may define a relationship between the different tables. In some embodiments, analytic evaluators may be arranged to look for one or more well-known naming conventions that may often be used for relationship columns. For example, if two different tables have columns named Patient ID, Patient_ID, or the like, relationship evaluators may be likely to infer a relationship. Likewise, for example, if a table is named "Student" and has an "ID" column, evaluators may infer that there may be relationships to other tables that include columns named "Student ID", or the like.

In some embodiments, evaluators may be arranged to focus analytical analysis on columns that may have a functional data type of 'identifier'. Accordingly, in some embodiments, analysis engines may be arranged to efficiently apply resources for determining relationships rather than having to employ brute force methods (e.g., executing test joins on every column combination across all tables).

In some embodiments, one or more analytical evaluators may be arranged to examine table names that may include naming conventions that may indicate the purpose of the table is to provide or enforce relationships. For example, a table named trelStudentCourse may indicate that the table may be used to store relationships between students and courses. In this example, it would be expected that trelStudentCourse includes columns for storing Student IDs and Course IDs. Thus, for this example, the column names and column functional data types may provide further evidence that a table stores relationship information.

Further, in some embodiments, some of the ingested data may be provided from database export files or directly from databases (via APIs). Accordingly, in some embodiments, there may be meta-data, such as declarations of PRIMARY KEY, FOREIGN KEYS, INDEX columns, or the like, that analytical evaluators may employ as evidence for predicting relationships.

At block 1306, in one or more of the various embodiments, analysis engines may be arranged to execute one or more statistical evaluators to infer one or more relationships in the data. In addition to examining features such as column headers, table names, or other metadata, analysis engines may be arranged to employ one or more evaluators to investigate the ingested data for evidence of relationships. For example, in some embodiments, some ingested data may be provided by applications that support users adding custom columns to existing tables. Thus, in some cases, the names of such columns may be names like "custom_column1" that may omit an indication that they may be associated with a relationship.

Accordingly, in some embodiments, evaluators may be arranged to employ metrics included in column profiles or other metrics generated by the evaluators themselves. For example, even though a column is a so-called custom column, it may be assigned a concrete data type or functional data type. Thus, in some embodiments, evaluators may be arranged to determine columns with functional data type of identifier even for custom columns. Also, in some embodiments, other metrics may be generated by evaluators as part of their investigation for evidence of relationships.

At block 1308, in one or more of the various embodiments, analysis engines may be arranged to execute one or more semantic evaluators to infer one or more relationships in the data. In some embodiments, semantic relationship evaluators may be arranged to investigate the potential for relationships that may be overlooked by other evaluators. In some embodiments, semantic evaluators may be arranged to generate prompts to provide to large language models. In some embodiments, these prompts may be directed to train large language models to provide responses that may identify or predict relationships.

At block 1310, in one or more of the various embodiments, analysis engines may be arranged to update a candidate schema based on the one or more relationships. In one or more of the various embodiments, analysis engines may be arranged to maintain a candidate schema that may be updated as the investigation for relationships occurs.

At block 1312, in one or more of the various embodiments, analysis engines may be arranged to validate the candidate schema. In some embodiments, if the evaluation has completed, analysis engines may be arranged to validate that the predicted relationships may be valid by automatically executing queries that include joins based on the predicted relationships. Accordingly, in some embodiments, joins that result in errors or empty result sets may indicate that a relationship has been erroneously predicted. Note, in some embodiments, in contrast to conventional brute-force methods of discovering joins, the test queries/joins may be directed to predicted relationships rather than to any or all columns or tables in the ingested data.

Next, in one or more of the various embodiments, control may be returned to a calling process.

Figure 14:
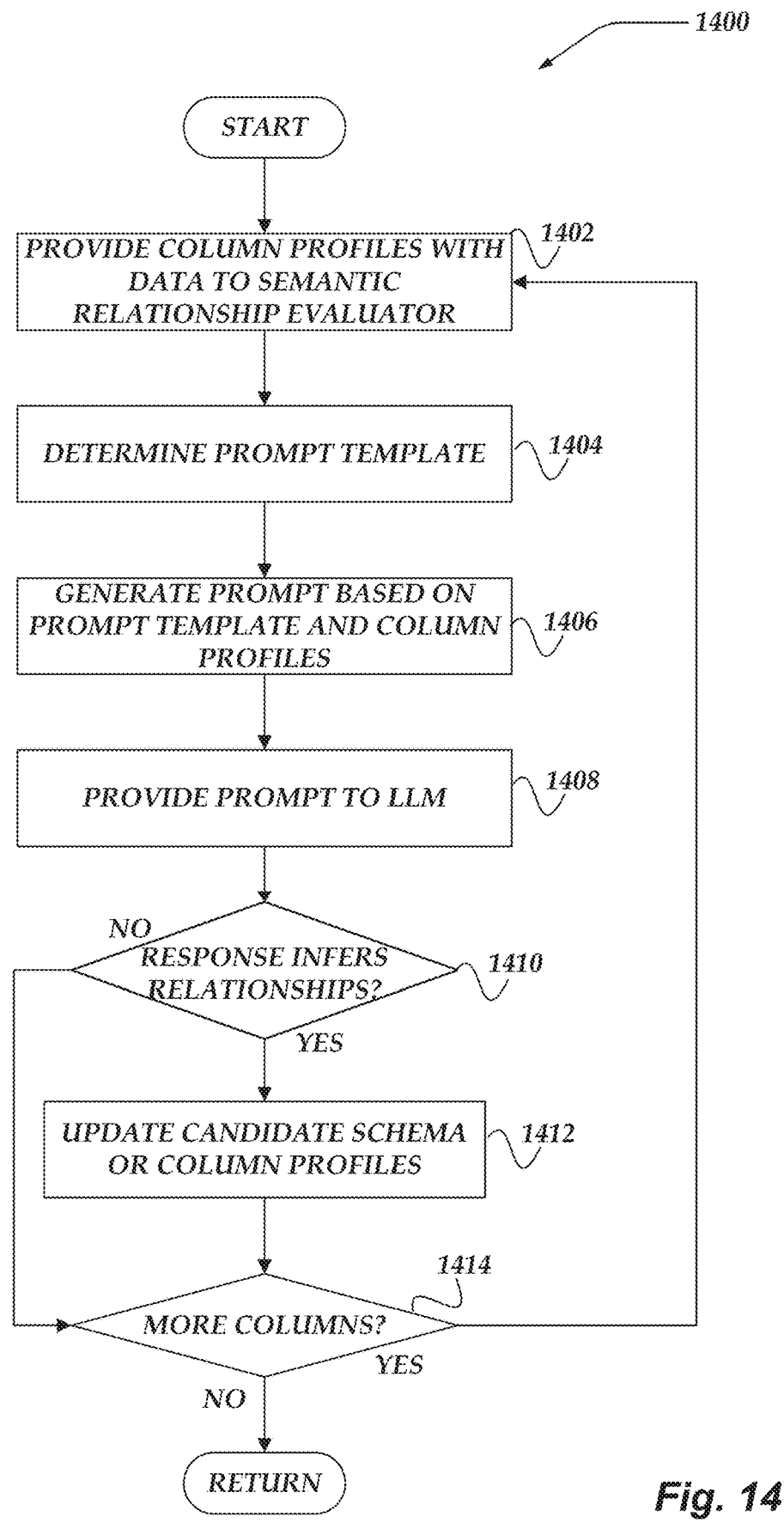
FIG. 14 illustrates a flowchart of a process for using large language models to infer relationships for schema inference systems in accordance with one or more of the various embodiments.

FIG. 14 illustrates a flowchart of process 1400 for using large language models to infer relationships for schema inference systems in accordance with one or more of the various embodiments. After a start block, at block 1402, in one or more of the various embodiments, column profiles with data may be provided to a semantic relationship evaluator.

At block 1404, in one or more of the various embodiments, the evaluator may be arranged to determine a prompt template. In one or more of the various embodiments, analysis engines may be arranged to have one or more prompt templates that are directed to training large language models to predict one or more relationships between tables of ingested data.

In some embodiments, the particular contents or prompt templates (or prompts) may be determined experimentally. Also, in some embodiments, as different types of data or data sources may be encountered, the prompt templates may be adapted by subsequent experimentation.

In one or more of the various embodiments, analysis engines may associate particular prompt templates with particular organizations, subject matter areas, industries, problem domains, or the like.

At block 1406, in one or more of the various embodiments, the evaluator may be arranged to generate a prompt based on the prompt template and the one or more column profiles. In one or more of the various embodiments, table or column information may be injected into prompts. In some embodiments, the injected information may include one or more portions of column profiles or table profiles.

Also, in some embodiments, injected information may include relationships predicted by analytic evaluators, statistical evaluators, or the like. For example, predicted relationships that have a confidence score above a threshold value may be included in the prompt as examples to guide the large language model in its search for overlooked relationships.

In some cases, for some embodiments, the target large language model may have a limit on the size of prompts. Accordingly, in some embodiments, analysis engines may be arranged to adapt which evaluators may be used or which data to inject into prompts based on the size of prompts. In some embodiments, analysis engines may be arranged to prioritize which information may be injected into prompts. Accordingly, in some embodiments, prompt information with lower priority may be excluded from prompts in favor of prompt information associated with higher priority. In some embodiments, the prioritization order may be determined experimentally. Accordingly, in some embodiments, analysis engines may be arranged to determine priority information for prompt injection based on configuration information to account for local circumstances or local requirements.

At block 1408, in one or more of the various embodiments, the evaluator may be arranged to provide the prompt to a large language model. In one or more of the various embodiments, semantic evaluators may be arranged to employ one or more large language model APIs to submit the prompt to the large language models. In one or more of the various embodiments, the targeted large language model may be remotely located (e.g., SaaS, cloud computing environments, or the like) or on-premises.

At decision block 1410, in one or more of the various embodiments, if the response from the large language model infers one or more relationships, control may flow block 1412; otherwise, control may flow to decision block 1414.

At block 1412, in one or more of the various embodiments, analysis engines may be arranged to update a candidate schema or update the one or more column profiles. In some embodiments, as relationships may be discovered, analysis engines may update the candidate schema to reflect the newly discovered relationships.

At decision block 1414, in one or more of the various embodiments, if there may be more columns to process, control may loop back to block 1402; otherwise, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a network using one or more processors to execute instructions that are configured to cause actions, comprising:
    employing raw data to determine one or more tables with one or more columns, wherein the raw data includes metadata and is organized in the one or more columns of one or more tables;
    employing the raw data to determine one or more concrete data types that correspond to the raw data organized in the one or more columns of the one or more tables;
    determining one or more functional data types for the one or more columns of the one or more tables based on the raw data and correspondence with the one or more concrete data types, wherein a portion of the one or more columns are associated with an identifier data type;
    determining one or more existing relationships associated with the one or more tables based on one or more of a metric or a statistical feature of the metadata for the raw data;
    determining one or more inferred relationships associated with the one or more tables based on the portion of the one or more columns associated with the identifier data type and one or more common values associated with the one or more functional data types for the one or more columns;
    employing one or more large language models to predict one or more inferred relationships associated with the one or more tables, wherein the one or more large language models are trained by one or more semantic relationship evaluators to generate the one or more predicted inferred relationships between the one or more tables;
    executing one or more join expressions on two or more predicted inferred relationships for validation, wherein each predicted inferred relationship associated with one or more join execution errors is invalidated; and
    generating a schema representing the raw data based on the one or more existing relationships, the one or more inferred relationships, each predicted inferred relationship that is validated, and the one or more tables.

2. The method of claim 1, further comprising:
    providing one or more queries that include one or more join expressions that are based on the one or more relationships; and
    validating the schema based on an execution of the one or more queries, wherein the validation is based on an absence of errors associated with the execution of the one or more queries.

3. The method of claim 1, further comprising:
    employing one or more data sources to provide the raw data, wherein the raw data includes one or more of a comma separated value file, a spreadsheet, an extensible markup language file, a database export file, an application export file, or a network connection to data source.

4. The method of claim 1, wherein determining the one or more concrete data types, further comprises:
    determining one or more evaluators that declare one or more operations to infer the one or more concrete data types; and
    inferring the one or more concrete data types based on the one or more operations, wherein the one or more concrete data types include one or more of an integer type, a floating point type, a character type, or a string type.

5. The method of claim 1, wherein determining the one or more functional data types, further comprises:
    determining one or more evaluators that declare one or more operations to infer the one or more functional data types; and
    inferring the one or more functional data types based on the one or more operations, wherein the one or more functional data types include one or more of the identifier data type, a category data type, a text data type, or a numeric data type.

6. The method of claim 1, further comprising:
    determining one or more metrics associated with the one or more columns based on the raw data, wherein the one or more metrics include one or more of a row count, a median value, a mean value, a cardinality, or a distribution of values; and
    providing a profile for each column, wherein the one or more metrics for each column are included in the profile; and
    employing the profile for each column to further determine the one or more concrete data types or the one or more functional data types.

7. The method of claim 1, further comprising:
    determining a portion of the one or more relationships based on an evaluation of header information associated with the one or more columns, wherein the portion of the one or more relationships are associated with a portion of the one or more columns that are associated with related header information.

8. The method of claim 1, further comprising:
    determining a portion of the one or more relationships based on an evaluation of one or more statistical features of a portion of the raw data associated with the portion of the one or more relationships.

9. The method of claim 1, further comprising:
    determining a portion of the one or more relationships based on an evaluation of one or more semantic characteristics of the one or more columns, wherein the evaluation of one or more semantic characteristics is based on a response from a large language model that is trained by a prompt that includes information associated with the one or more columns.

10. A network computer for managing data, comprising:
    a memory that stores at least instructions; and
    one or more processors that execute instructions that are configured to cause actions, including:
        employing raw data to determine one or more tables with one or more columns, wherein the raw data includes metadata and is organized in the one or more columns of one or more tables;
        employing the raw data to determine one or more concrete data types that correspond to the raw data organized in the one or more columns of the one or more tables;
        determining one or more functional data types for the one or more columns of the one or more tables based on the raw data and correspondence with the one or more concrete data types, wherein a portion of the one or more columns are associated with an identifier data type;

determining one or more existing relationships associated with the one or more tables based on one or more of a metric or a statistical feature of the metadata for the raw data;

determining one or more inferred relationships associated with the one or more tables based on the portion of the one or more columns associated with the identifier data type and one or more common values associated with the one or more functional data types for the one or more columns;

employing one or more large language models to predict one or more inferred relationships associated with the one or more tables, wherein the one or more large language models are trained by one or more semantic relationship evaluators to generate the one or more predicted inferred relationships between the one or more tables;

executing one or more join expressions on two or more predicted inferred relationships for validation, wherein each predicted inferred relationship associated with one or more join execution errors is invalidated; and generating a schema representing the raw data based on the one or more existing relationships, the one or more inferred relationships, each predicted inferred relationship that is validated, and the one or more tables.

11. The network computer of claim 10, further comprising:

providing one or more queries that include one or more join expressions that are based on the one or more relationships; and validating the schema based on an execution of the one or more queries, wherein the validation is based on an absence of errors associated with the execution of the one or more queries.

12. The network computer of claim 10, further comprising:

employing one or more data sources to provide the raw data, wherein the raw data includes one or more of a comma separated value file, a spreadsheet, an extensible markup language file, a database export file, an application export file, or a network connection to data source.

13. The network computer of claim 10, wherein determining the one or more concrete data types, further comprises:

determining one or more evaluators that declare one or more operations to infer the one or more concrete data types; and inferring the one or more concrete data types based on the one or more operations, wherein the one or more concrete data types include one or more of an integer type, a floating point type, a character type, or a string type.

14. The network computer of claim 10, wherein determining the one or more functional data types, further comprises:

determining one or more evaluators that declare one or more operations to infer the one or more functional data types; and inferring the one or more functional data types based on the one or more operations, wherein the one or more functional data types include one or more of the identifier data type, a category data type, a text data type, or a numeric data type.

15. The network computer of claim 10, further comprising:

determining one or more metrics associated with the one or more columns based on the raw data, wherein the one or more metrics include one or more of a row count, a median value, a mean value, a cardinality, or a distribution of values; and providing a profile for each column, wherein the one or more metrics for each column are included in the profile; and employing the profile for each column to further determine the one or more concrete data types or the one or more functional data types.

16. The network computer of claim 10, further comprising:

determining a portion of the one or more relationships based on an evaluation of header information associated with the one or more columns, wherein the portion of the one or more relationships are associated with a portion of the one or more columns that are associated with related header information.

17. The network computer of claim 10, further comprising:

determining a portion of the one or more relationships based on an evaluation of one or more statistical features of a portion of the raw data associated with the portion of the one or more relationships.

18. The network computer of claim 10, further comprising:

determining a portion of the one or more relationships based on an evaluation of one or more semantic characteristics of the one or more columns, wherein the evaluation of one or more semantic characteristics is based on a response from a large language model that is trained by a prompt that includes information associated with the one or more columns.

19. A processor readable non-transitory storage media that includes instructions configured for managing data over a network, wherein execution of the instructions by one or more processors on one or more network computers performs actions, comprising:

employing raw data to determine one or more tables with one or more columns, wherein the raw data includes metadata and is organized in the one or more columns of one or more tables;

employing the raw data to determine one or more concrete data types that correspond to the raw data organized in the one or more columns of the one or more tables;

determining one or more functional data types for the one or more columns of the one or more tables based on the raw data and correspondence with the one or more concrete data types, wherein a portion of the one or more columns are associated with an identifier data type;

determining one or more existing relationships associated with the one or more tables based on one or more of a metric or a statistical feature of the metadata for the raw data;

determining one or more inferred relationships associated with the one or more tables based on the portion of the one or more columns associated with the identifier data type and one or more common values associated with the one or more functional data types for the one or more columns;

employing one or more large language models to predict one or more inferred relationships associated with the one or more tables, wherein the one or more large language models are trained by one or more semantic relationship evaluators to generate the one or more predicted inferred relationships between the one or more tables;

executing one or more join expressions on two or more predicted inferred relationships for validation, wherein each predicted inferred relationship associated with one or more join execution errors is invalidated; and generating a schema representing the raw data based on the one or more existing relationships, the one or more inferred relationships, each predicted inferred relationship that is validated, and the one or more tables.

20. The media of claim 19, further comprising:

providing one or more queries that include one or more join expressions that are based on the one or more relationships; and validating the schema based on an execution of the one or more queries, wherein the validation is based on an absence of errors associated with the execution of the one or more queries.

21. The media of claim 19, further comprising:

employing one or more data sources to provide the raw data, wherein the raw data includes one or more of a comma separated value file, a spreadsheet, an extensible markup language file, a database export file, an application export file, or a network connection to data source.

22. The media of claim 19, wherein determining the one or more concrete data types, further comprises:

determining one or more evaluators that declare one or more operations to infer the one or more concrete data types; and inferring the one or more concrete data types based on the one or more operations, wherein the one or more concrete data types include one or more of an integer type, a floating point type, a character type, or a string type.

23. The media of claim 19, wherein determining the one or more functional data types, further comprises:

determining one or more evaluators that declare one or more operations to infer the one or more functional data types; and inferring the one or more functional data types based on the one or more operations, wherein the one or more functional data types include one or more of the identifier data type, a category data type, a text data type, or a numeric data type.

24. The media of claim 19, further comprising:

determining one or more metrics associated with the one or more columns based on the raw data, wherein the one or more metrics include one or more of a row count, a median value, a mean value, a cardinality, or a distribution of values; and providing a profile for each column, wherein the one or more metrics for each column are included in the profile; and employing the profile for each column to further determine the one or more concrete data types or the one or more functional data types.

25. The media of claim 19, further comprising:

determining a portion of the one or more relationships based on an evaluation of header information associated with the one or more columns, wherein the portion of the one or more relationships are associated with a portion of the one or more columns that are associated with related header information.

26. The media of claim 19, further comprising:

determining a portion of the one or more relationships based on an evaluation of one or more statistical features of a portion of the raw data associated with the portion of the one or more relationships.

27. The media of claim 19, further comprising:

determining a portion of the one or more relationships based on an evaluation of one or more semantic characteristics of the one or more columns, wherein the evaluation of one or more semantic characteristics is based on a response from a large language model that is trained by a prompt that includes information associated with the one or more columns.

* * * * *